(12) United States Patent
Takahashi

(10) Patent No.: US 10,581,107 B2
(45) Date of Patent: Mar. 3, 2020

(54) SECONDARY BATTERY AND MANUFACTURING METHOD THEREOF

(71) Applicant: SEMICONDUCTOR ENERGY LABORATORY CO., LTD., Atsugi-shi, Kanagawa-ken (JP)

(72) Inventor: Minoru Takahashi, Nagano (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 215 days.

(21) Appl. No.: 15/522,413

(22) PCT Filed: Oct. 26, 2015

(86) PCT No.: PCT/IB2015/058230
§ 371 (c)(1),
(2) Date: Apr. 27, 2017

(87) PCT Pub. No.: WO2016/071798
PCT Pub. Date: May 12, 2016

(65) Prior Publication Data
US 2017/0317374 A1 Nov. 2, 2017

(30) Foreign Application Priority Data
Nov. 7, 2014 (JP) .................................. 2014-226812
Nov. 7, 2014 (JP) .................................. 2014-226814

(51) Int. Cl.
*H01M 10/04* (2006.01)
*H01M 10/0585* (2010.01)
(Continued)

(52) U.S. Cl.
CPC ............ *H01M 10/04* (2013.01); *H01G 11/12* (2013.01); *H01G 11/52* (2013.01); *H01G 11/56* (2013.01);
(Continued)

(58) Field of Classification Search
CPC ........ H01G 11/12; H01G 11/52; H01G 11/56; H01G 11/60; H01G 11/62; H01G 11/72;
(Continued)

(56) References Cited

U.S. PATENT DOCUMENTS 7,318,979 B2    1/2008   Fukuzawa et al.
7,547,489 B2    6/2009   Nishimura et al.
(Continued)

FOREIGN PATENT DOCUMENTS

EP       1422780 A      5/2004
EP       1589597 A      10/2005
(Continued)

OTHER PUBLICATIONS

International Search Report (Application No. PCT/IB2015/058230) dated Feb. 9, 2016.
(Continued)

*Primary Examiner* — Lingwen R Zeng
(74) *Attorney, Agent, or Firm* — Nixon Peabody LLP; Jeffrey L. Costellia

(57) ABSTRACT

To provide a secondary battery that can be mounted on a substrate and can easily select a voltage to be output in manufacture and a manufacturing method thereof. A secondary battery in which small cells with substantially the same form are stacked and whose voltage to be output is easily selected in manufacture by changing the number of stacked layers is manufactured. In the cell, an electrolytic solution including a spacer and a polymer is used to keep at least a certain distance between the positive electrode active material layer and the negative electrode active material layer with the spacer. Furthermore, the electrolytic solution is made to gelate by the polymer to be an electrolytic solution that can be formed in the form of a sheet. Furthermore, the positive electrode active material layer and the
(Continued)

negative electrode active material layer are formed using a printing method typified by screen printing.

7 Claims, 20 Drawing Sheets

(51) Int. Cl.
| | | |
|---|---|---|
| *H01M 10/0569* | (2010.01) | |
| *H01M 2/16* | (2006.01) | |
| *H01M 10/0565* | (2010.01) | |
| *H01G 11/60* | (2013.01) | |
| *H01G 11/12* | (2013.01) | |
| *H01G 11/72* | (2013.01) | |
| *H01G 11/62* | (2013.01) | |
| *H01M 10/052* | (2010.01) | |
| *H01M 10/0568* | (2010.01) | |
| *H01M 2/02* | (2006.01) | |
| *H01G 11/56* | (2013.01) | |
| *H01G 11/82* | (2013.01) | |
| *H01G 11/52* | (2013.01) | |
| *H01G 11/78* | (2013.01) | |

(52) U.S. Cl.
CPC ............ *H01G 11/60* (2013.01); *H01G 11/62* (2013.01); *H01G 11/72* (2013.01); *H01G 11/78* (2013.01); *H01G 11/82* (2013.01); *H01M 2/022* (2013.01); *H01M 2/0217* (2013.01); *H01M 2/16* (2013.01); *H01M 2/166* (2013.01); *H01M 10/052* (2013.01); *H01M 10/0565* (2013.01); *H01M 10/0568* (2013.01); *H01M 10/0569* (2013.01); *H01M 10/0585* (2013.01); *H01M 2300/0037* (2013.01)

(58) Field of Classification Search
CPC ....... H01G 11/78; H01G 11/82; H01M 10/04; H01M 10/052; H01M 10/0565; H01M 10/0568; H01M 10/0569; H01M 10/0585; H01M 2300/0037; H01M 2/0217; H01M 2/022; H01M 2/16; H01M 2/166
See application file for complete search history.

(56) References Cited

U.S. PATENT DOCUMENTS

| | | | |
|---|---|---|---|
| 7,833,656 B2* | 11/2010 | Nishimura | H01M 2/0207 429/122 |
| 7,858,231 B2 | 12/2010 | Nishimura et al. | |
| 8,232,004 B2 | 7/2012 | Takahashi | |
| 8,357,463 B2 | 1/2013 | Fukuzawa et al. | |
| 9,203,110 B2 | 12/2015 | Fukuzawa et al. | |
| 2004/0086781 A1 | 5/2004 | Fukuzawa et al. | |
| 2008/0138701 A1 | 6/2008 | Kuboki et al. | |
| 2008/0268337 A1 | 10/2008 | Fukuzawa et al. | |
| 2013/0136999 A1 | 5/2013 | Fukuzawa et al. | |
| 2015/0004464 A1* | 1/2015 | Okuno | H01M 2/18 429/143 |

FOREIGN PATENT DOCUMENTS

| | | |
|---|---|---|
| EP | 1596459 A | 11/2005 |
| EP | 1612873 A | 1/2006 |
| JP | 63-237361 A | 10/1988 |
| JP | 03-129603 A | 6/1991 |
| JP | 08-148163 A | 6/1996 |
| JP | 11-307124 A | 11/1999 |
| JP | 2004-071303 A | 3/2004 |
| JP | 2004-152596 A | 5/2004 |
| JP | 2004-253351 A | 9/2004 |
| JP | 2007-273436 A | 10/2007 |
| JP | 2008-053102 A | 3/2008 |
| JP | 2008-147391 A | 6/2008 |
| JP | 2011-171293 A | 9/2011 |
| JP | 2011-204510 A | 10/2011 |
| JP | 2012-156128 A | 8/2012 |
| JP | 2014-116156 A | 6/2014 |
| WO | WO-2008/023255 | 2/2008 |
| WO | WO-2014/050500 | 4/2014 |

OTHER PUBLICATIONS

Written Opinion (Application No. PCT/IB2015/0582311) dated Feb. 9, 2016.

* cited by examiner

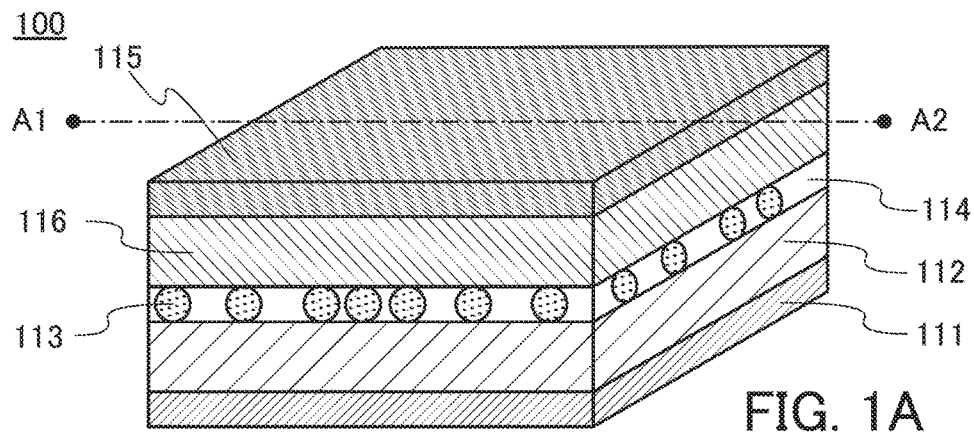
FIG. 1A
FIG. 1B
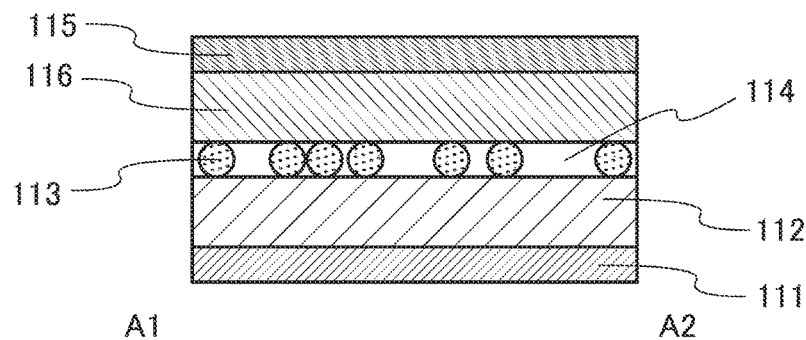
FIG. 1C
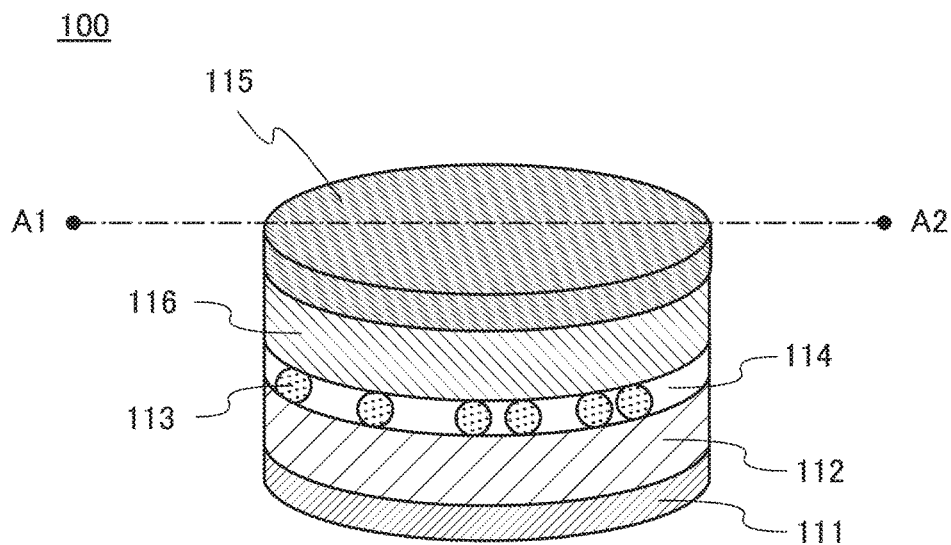

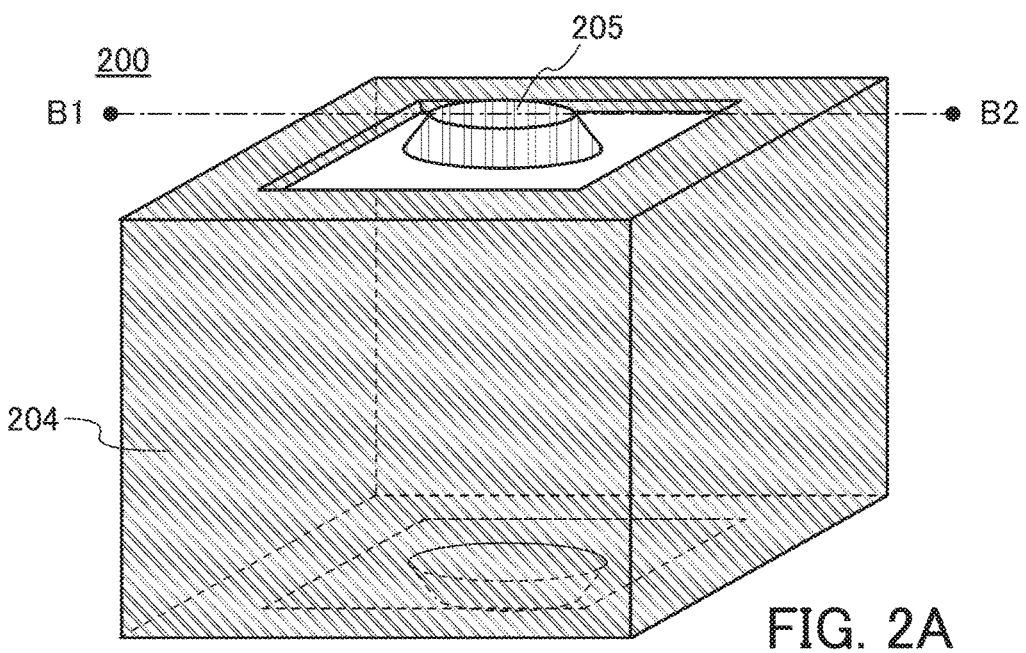
FIG. 2A
FIG. 2B
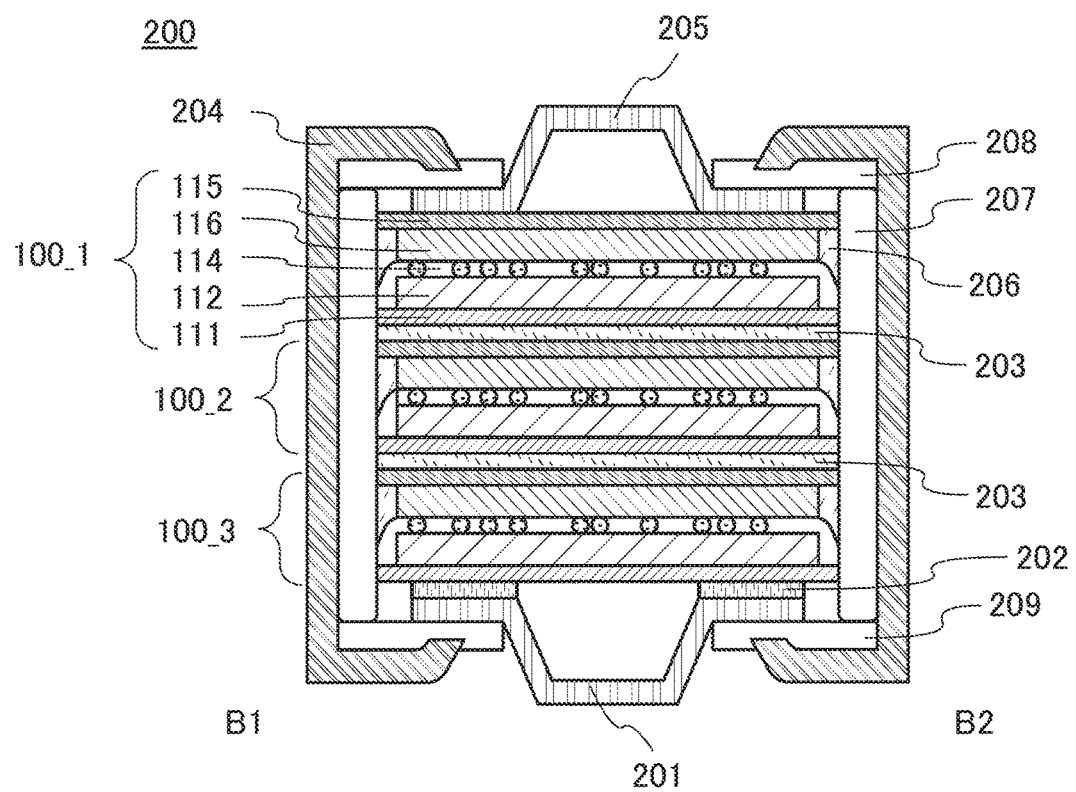

SECONDARY BATTERY AND MANUFACTURING METHOD THEREOF

TECHNICAL FIELD

The present invention relates to an object, a method, or a manufacturing method. Alternatively, the present invention relates to a process, a machine, manufacture, or a composition of matter (composition of matter). In particular, one embodiment of the present invention relates to a semiconductor device, a display device, a light-emitting device, a power storage device, an imaging device, a driving method thereof, or a manufacturing method thereof. In particular, one embodiment of the present invention relates to a secondary battery and a manufacturing method of the secondary battery.

BACKGROUND ART

With the spread of portable devices and wearable devices, demand for an increase in the capacity of secondary batteries mounted on them and a reduction in the weight and volume of the secondary batteries has been increasingly growing. Meanwhile, because of optimization of electrical specifications such as efficiency, an SN ratio, and a standard in a memory, input/output, an analog circuit, and the like, there is a tendency that various kinds of voltages such as 2.5 V, 5 V, 7 V, 12 V, and ±6 V are required as voltages to be supplied to them. Under the present conditions, the voltage extracted from a battery that supplies a constant voltage is converted via a step-up, step-down, or step-up and step-down DC/DC converter into a voltage required by each circuit.

For example, Patent Document 1 discloses a semiconductor device incorporating a nonaqueous secondary battery.

Meanwhile, as for wiring in general electronic devices, the shortest wiring is not necessarily used for a power supply line so that interference is prevented. However, in switching at a high frequency, the inductance and the like of wiring inevitably increases and resonance occurs at a certain frequency; thus, it has been difficult to obtain a sufficient constant voltage property.

PRIOR ART DOCUMENT

Patent Document

[Patent Document 1] Japanese Published Patent Application No. 2008-147391

SUMMARY OF THE INVENTION

Problems to be Solved by the Invention

An efficient method to suppress resonance is to make wiring extremely short. In the case where wiring is extremely short, a resonance frequency is very high; thus, the influence can be ignored. This needs a reduction in the distance between a chip on which a circuit that requires a certain voltage is mounted and a power source that supplies the voltage. In other words, it is ideal to make "local cell", in which a secondary battery that supplies a certain voltage is positioned near a chip that requires the voltage.

However, a secondary battery under the present conditions does not have a structure suitable for serial connection on a printed board for the obtainment of a desired voltage. Thus, a problem of one embodiment of the present invention is to provide a method for manufacturing a secondary battery that can be mounted on a substrate and can easily select a voltage to be output in manufacture.

Alternatively, a problem of one embodiment of the present invention is to provide a novel power storage device, a novel secondary battery, an electronic device including the novel secondary battery, or the like. Note that the description of these problems does not disturb the existence of other problems. Note that one embodiment of the present invention does not need to solve all the problems. Note that other problems will be apparent from and can be derived from the description of the specification, the drawings, the claims, and the like.

Means for Solving the Problems

To achieve the above object, in one embodiment of the present invention, a secondary battery in which small cells with substantially the same form are stacked and that can easily select a voltage to be output in manufacture by changing the number of stacked layers is manufactured.

In the cell, an electrolytic solution including a spacer and a polymer is used to keep at least a certain distance between the positive electrode active material layer and the negative electrode active material layer with the spacer. Furthermore, the electrolytic solution is made to gelate by the polymer to be an electrolytic solution that can be formed in the form of a sheet.

Furthermore, the positive electrode active material layer and the negative electrode active material layer are formed using a printing method typified by screen printing.

One embodiment of the present invention is a secondary battery comprising a positive electrode current collector, a positive electrode active material layer over the positive electrode current collector, a negative electrode current collector, a negative electrode active material layer over the negative electrode current collector, an electrolytic solution, and an exterior body, in which the exterior body covers the positive electrode current collector, the positive electrode active material layer, the negative electrode current collector, the negative electrode active material layer, and the electrolytic solution, the electrolytic solution includes a spacer, a polymer, an electrolyte, and a solvent, the spacer has a function of keeping at least a certain distance between the positive electrode active material layer and the negative electrode active material layer, and the polymer has a function of making the electrolytic solution gelate.

Furthermore, in the above structure, the spacer preferably has a function of making the electrolytic solution gelate.

Furthermore, in the above structure, the spacer is preferably a particle including aluminum oxide.

Furthermore, in the above structure, it is preferable that the polymer included in the electrolytic solution include PVDF, the electrolyte include $Li(SO_2F)_2N$, and the solvent include ethylene carbonate (EC) and propylene carbonate (PC).

One embodiment of the present invention is a secondary battery comprising a first cell, a second cell, and an exterior body, in which the exterior body covers the first cell and the second cell, the first cell and the second cell are electrically connected in series, the first cell includes a first positive electrode current collector, a first positive electrode active material layer over the first positive electrode current collector, a first negative electrode current collector, a first negative electrode active material layer over the first negative electrode current collector, and a first electrolytic solution, the first electrolytic solution includes a first spacer, a first polymer, a first electrolyte, and a first solvent, the first spacer has a function of keeping at least a certain distance between the first positive electrode active material layer and the first negative electrode active material layer, the first polymer has a function of making the first electrolytic solution gelate, the second cell includes a second positive electrode current collector, a second positive electrode active material layer over the second positive electrode current collector, a second negative electrode current collector, a second negative electrode active material layer over the second negative electrode current collector, and a second electrolytic solution, the second electrolytic solution includes a second spacer, a second polymer, a second electrolyte, and a second solvent, the second spacer has a function of keeping at least a certain distance between the second positive electrode active material layer and the second negative electrode active material layer, and the second polymer has a function of making the second electrolytic solution gelate.

One embodiment of the present invention is a method for manufacturing a secondary battery, comprising a step of forming a first positive electrode active material layer and a second positive electrode active material layer over a positive electrode current collector, a step of forming a first negative electrode active material layer and a second negative electrode active material layer over a negative electrode current collector, a step of positioning an electrolytic solution including a spacer over the positive electrode current collector such that the first positive electrode active material layer and the second positive electrode active material layer are in contact with the electrolytic solution, a step of positioning the negative electrode current collector over the electrolytic solution such that the electrolytic solution is in contact with the first negative electrode active material layer and the second negative electrode active material layer, the first positive electrode active material layer and the first negative electrode active material layer overlap with each other, and the second positive electrode active material layer and the second negative electrode active material layer overlap with each other, a step of heating and pressurizing the positive electrode current collector, the first positive electrode active material layer, the second positive electrode active material layer, the electrolytic solution, the first negative electrode active material layer, the second negative electrode active material layer, and the negative electrode current collector, a step of injecting an insulator whose fluidity is increased by heating into a region between the positive electrode current collector and the negative electrode current collector, a step of cutting the positive electrode current collector, the negative electrode current collector, the electrolytic solution, and the insulator between the first positive electrode active material layer and the second positive electrode active material layer, a step of electrically connecting in series a first cell including the first positive electrode active material layer and the first negative electrode active material layer and a second cell including the second positive electrode active material layer and the second negative electrode active material layer, which are fabricated in the cutting step, and a step of covering the first cell and the second cell with the exterior body.

Furthermore, in the above structure, it is preferable that the electrolytic solution include a polymer, an electrolyte, and a solvent and the electrolytic solution be a sheet-like gel in the step of positioning the electrolytic solution over the positive electrode current collector such that the first positive electrode active material layer and the second positive electrode active material layer are in contact with the electrolytic solution.

Furthermore, in the above structure, the spacer is preferably a particle including aluminum oxide.

Effect of the Invention

According to one embodiment of the present invention, a method for manufacturing a secondary battery that can be mounted on a substrate and can easily select a voltage to be output in manufacture can be provided.

Alternatively, a novel power storage device, a novel secondary battery, an electronic device including the novel secondary battery, or the like can be provided. Note that the description of these problems does not disturb the existence of other effects. Note that one embodiment of the present invention does not need to have all the effects. Note that other effects will be apparent from and can be derived from the description of the specification, the drawings, the claims, and the like.

BRIEF DESCRIPTION OF THE DRAWINGS

FIG. 1 A perspective view and a cross-sectional view of an example of a secondary battery.
FIG. 2 A perspective view and a cross-sectional view of an example of a secondary battery.

MODE FOR CARRYING OUT THE INVENTION

Figure 3A:
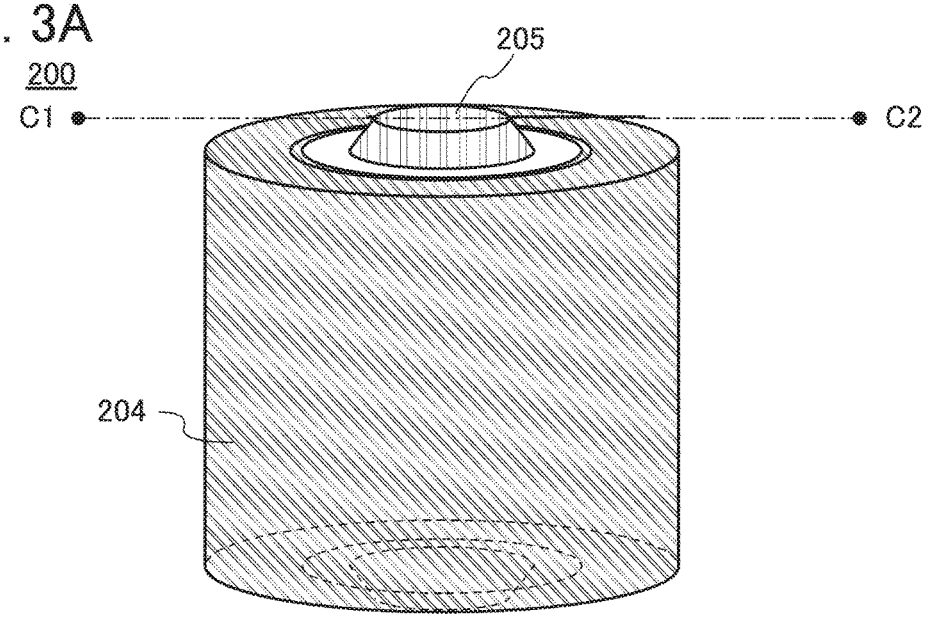
FIG. 3 A perspective view and a cross-sectional view of an example of a secondary battery.

Embodiments of the present invention will be described below in detail using the drawings. However, the present invention is not limited to the description below, and it is easily understood by those skilled in the art that modes and details thereof can be modified in various ways. Further, the present invention is not construed as being limited to the content of the description of the embodiments.

The term "electrically connected" includes the case of connection through an "object having any electric function". Here, there is no particular limitation on the "object having any electric function" as long as electric signals can be transmitted and received between connected objects.

The position, size, range, or the like of each structure illustrated in drawings and the like do not represent the actual position, size, range, or the like in some cases for easy understanding. Therefore, the disclosed invention is not necessarily limited to the position, size, range, or the like disclosed in the drawings and the like.

The ordinal numbers such as "first", "second", and "third" are given to avoid confusion among components.

(Embodiment 1)

In this embodiment, an example of a secondary battery of one embodiment of the present invention is described using FIG. 1 to FIG. 4.

First, FIG. 1(A) shows a perspective view of a cell 100 included in a secondary battery. FIG. 1(B) shows a cross-sectional view along A1-A2 in FIG. 1(A).

The cell 100 includes a positive electrode current collector 111, a positive electrode active material layer 112 provided over the positive electrode current collector 111, a negative electrode current collector 115, and a negative electrode active material layer 116 provided over the negative electrode current collector 115. The positive electrode active material layer 112 includes a positive electrode active material. Furthermore, the negative electrode active material layer 116 includes a negative electrode active material. Furthermore, the cell 100 includes an electrolytic solution 114 including spacers 113 between the positive electrode active material layer 112 and the negative electrode active material layer 116.

The long side of the positive electrode current collector 111 and the negative electrode current collector 115 is preferably 3 cm or less, more preferably 5 mm or less. By making the positive electrode current collector 111 and the negative electrode current collector 115 small, the cell 100 can be small.

The spacer 113 included in the electrolytic solution 114 has a function of keeping at least a certain distance between the positive electrode active material layer 112 and the negative electrode active material layer 116. In other words, the spacer 113 functions as a separator in the cell 100.

The electrolytic solution 114 includes a polymer, an electrolyte, and a solvent. The polymer enables gelation of the electrolytic solution 114. Gelation allows the electrolytic solution 114 to be formed in the form of a sheet; thus, a manufacturing process of the cell 100 can be simplified significantly. Note that in this specification and the like, gels include a chemical gel and a physical gel. In addition, gelation means that polymers are cross-linked.

As the polymer included in the electrolytic solution 114, for example, a polyethylene oxide-based, polyacrylonitrile-based, polyvinylidene fluoride-based, polyacrylate-based, or polymethacrylate-based polymer can be used. Furthermore, a polymer which can make the electrolytic solution 114 gelate at normal temperature (e.g., 25° C.) is preferably used. Note that in this specification and the like, polyvinylidene fluoride-based polymer, for example, means a polymer including polyvinylidene fluoride (PVDF), and includes a poly(vinylidene fluoride-hexafluoropropylene) copolymer and the like.

Note that the above polymer can be qualitatively analyzed using a FT-IR (Fourier transform infrared spectrometer) or the like. For example, the polyvinylidene fluoride-based polymer has an absorption pattern showing a C—F bond in a spectrum obtained with the FT-IR. Furthermore, the polyacrylonitrile-based polymer has an absorption pattern showing a C≡N bond in an absorption spectrum obtained with the FT-IR.

Furthermore. as an electrolyte included in the electrolytic solution 114, a material in which carrier ions can move is used. In the case where lithium ions are used as carrier ions, typical examples of the electrolyte are lithium salts such as $LiPF_6$, $LiClO_4$. $LiAsF_6$, $LiBF_4$, $LiCF_3SO_3$, $Li(CF_3SO_2)_2N$. $Li(C_2F_5SO_2)_2N$. and $Li(SO_2F)_2N$. One of these electrolytes may be used alone or two or more of them may be used in an appropriate combination and ratio.

Furthermore, as a solvent included in the electrolytic solution 114, a material in which carrier ions can move is used. As the solvent of the electrolytic solution, an aprotic organic solvent is preferable. Typical examples of the aprotic organic solvent include ethylene carbonate (EC), propylene carbonate (PC), dimethyl carbonate, diethyl carbonate (DEC), ethylmethyl carbonate (EMC), γ-butyrolactone, acetonitrile, dimethoxyethane, tetrahydrofuran, and the like, and one or more of these can be used. Furthermore, the use of one or more of non-flammable and non-volatile ionic liquids (room temperature molten salts) as a solvent of the electrolytic solution can prevent a storage battery from exploding or catching fire even when the storage battery internally shorts out or the internal temperature increases owing to overcharge or the like. Note that an ionic liquid is a salt in the fluid state and has high ion mobility (conductivity). Furthermore, the ionic liquid includes a cation and an anion. As an ionic liquid, there is an ionic liquid containing an ethylmethylimidazolium (EMI) cation or an ionic liquid containing an N-methyl-N-propylpiperidinium ($PP_{13}$) cation.

In this embodiment, PVDF is used as the polymer included in the electrolytic solution 114, $Li(SO_2)_2N$ is used as the electrolyte, and a mixed solvent of EC and PC is used as the solvent.

As the spacer 113, a particle of an insulator is used. As a material, for example, aluminum oxide, silicon oxide, glass, and resins typified by a fluorine resin, nylon, ABS, a phenol resin, acrylic, and an epoxy resin can be used. As the shape of the spacer 113, a particle with a particle diameter of greater than or equal to 10 μm and less than or equal to 100 μm is preferable, and a particle with a particle diameter of greater than or equal to 17 μm and less than or equal to 20 μm is more preferable. The shape may be an ellipsoidal shape, a rectangular column, or the like, other than a spherical shape. Note that in this specification and the like, the electrolytic solution 114 including the spacers 113 also means the state in which the spacers 113 are mixed into the electrolytic solution 114. Furthermore, in this specification and the like, the particle diameter of the spacer 113 refers to the geometrical average particle diameter of particles. The geometrical average particle diameter can be obtained by microscopy with a SEM or a TEM, for example.

There is no particular limitation on a material used for the positive electrode current collector 111 and the negative electrode current collector 115 as long as it exhibits high conductivity without causing a significant chemical change in a secondary battery. For example, a metal such as gold, platinum, iron, nickel, copper, aluminum, titanium, tantalum, or manganese, and an alloy thereof (such as stainless steel) can be used. Furthermore, covering with carbon, nickel, titanium, or the like may be performed. Furthermore, silicon, neodymium, scandium, molybdenum, or the like may be added to improve heat resistance. Furthermore, for the current collectors, shapes of various modes and the like including a foil-like shape, a sheet-like shape, a plate-like shape, a net-like shape, a cylindrical shape, a coil shape, a punching-metal shape, an expanded-metal shape, a porous shape, and non-woven fabric can be used as appropriate. Moreover, the current collectors may have micro irregularities on the surfaces thereof in order to enhance adhesion to active materials. Furthermore, the current collectors with a thickness of greater than or equal to 5 µm and less than or equal to 30 µm are preferably used.

The positive electrode active material and the negative electrode active material can be any material as long as it can reversibly react with carrier ions such as lithium ions. The average diameter or diameter distribution of the active material can be controlled by crushing, granulation, and classification by an appropriate means.

Positive electrode active materials that can be used for the positive electrode active material layer include a composite oxide with an olivine type crystal structure, a layered rock-salt type crystal structure, or a spinel type crystal structure, and the like. For example, a compound such as $LiFeO_2$, $LiCoO_2$, $LiNiO_2$, $LiMn_2O_4$, $V_2O_5$, $Cr_2O_5$, or $MnO_2$ can be used as the positive electrode active material.

Alternatively, a composite material (the general formula $LiMPO_4$ (M is one or more of Fe(II), Mn(II), Co(II), and Ni(II))) can be used. As a typical example of the general formula $LiMPO_4$, a lithium compound such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$, (a+b is 1 or less, 0<a<1, 0<b<1), $LiFe_cNi_dCo_ePO_4$, $LiFe_cNi_dMn_ePO_4$, $LiNi_cCo_dMn_ePO_4$ (c+d+e is 1 or less, 0<c<1, 0<d<1, 0<e<1), or $LiFe_fNi_gCo_hMn_iPO_4$ (f+g+h+i is 1 or less, 0<f<1, 0<g<1, 0<h<1, 0<i<1) can be used as a material.

Alternatively, a composite material such as the general formula $Li_{(2-j)}MSiO_4$ (M is one or more of Fe(II), Mn(II), Co(II), and Ni(II), 0≤j≤2) can be used. As a typical example of the general formula $Li_{(2-j)}MSiO_4$, a lithium compound such as $Li_{(2-j)}FeSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l is 1 or less, 0<k<1, 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q is 1 or less, 0<m<1, 0<n<1, 0<q<1), or $Li_{(2-j)}Fe_rNi_sCo_tMn_uSiO_4$ (r+s+t+u is 1 or less, 0<r<1, 0<s<1, 0<t<1, 0<u<1) can be used as a material.

Furthermore, a NASICON type compound expressed by the general formula of $A_xM_2(XO_4)_3$ (A=Li, Na, Mg, M=Fe, Mn, Ti, V. Knob, Al, X=S, P, Mo, W, As, Si) can be used for the positive electrode active material. As the NASICON type compound, $Fe_2(MnO_4)_3$, $Fe_2(SO_4)_3$, $Li_3Fe_2(PO_4)_3$, and the like are given. Furthermore, a material, for example, a compound expressed by the general formula of $Li_2MPO_4F$, $Li_2MP_2O_7$, or $Li_5MO_4$ (M=Fe, Mn), a perovskite fluoride such as $NaFeF_3$ or $FeF_3$, a metal chalcogenide (a sulfide, a selenide, a telluride) such as $TiS_2$ or $MoS_2$, an oxide with an inverse spinel type structure such as $LiMVO_4$, vanadium oxides ($V_2O_5$, $V_6O_{13}$, $LiV_3O_8$, and the like), a manganese oxide, an organic sulfur compound, or the like can be used as the positive electrode active material.

Note that in the case where carrier ions are alkali metal ions other than lithium ions, or alkaline-earth metal ions, as the positive electrode active material, an alkali metal (e.g., sodium, potassium, and the like) or an alkaline-earth metal (e.g., calcium, strontium, barium, beryllium, and magnesium) may be substituted for lithium in the lithium compound, the lithium-containing complex phosphate, the lithium-containing complex silicate, and the like.

Furthermore, the positive electrode active material layer may include a binder (binder) for increasing adhesion of active materials, a conductive additive for increasing the conductivity of the positive electrode active material layer, and the like in addition to the above-described positive electrode active materials.

Furthermore, a material with which lithium can be dissolved and deposited or that can reversibly react with lithium ions can be used for a negative electrode active material of the negative electrode active material layer; lithium metal, a carbon-based material, an alloy-based material, or the like can be used.

Lithium metal is preferable because of its low redox potential (−3.045 V with respect to a standard hydrogen electrode) and a high specific capacity per weight and volume (3860 mAh/g and 2062 mAh/cm$^3$, respectively).

As the carbon-based material, there are graphite, graphitizing carbon (soft carbon), non-graphitizing carbon (hard carbon), a carbon nanotube, graphene, carbon black, and the like.

As the graphite, there are artificial graphite such as meso-carbon microbeads (MCMB), coke-based artificial graphite, or pitch-based artificial graphite and natural graphite such as spherical natural graphite.

Graphite exhibits a low potential substantially equal to that of lithium metal (0.1 V or more and 0.3 V or less vs. Li/Li$^+$) when lithium ions are intercalated into the graphite (while a lithium-graphite intercalation compound is formed). For this reason, a lithium-ion secondary battery can exhibit a high operating voltage. In addition, graphite is preferable because of its advantages such as a relatively high capacity per unit volume, small volume expansion, low cost, and safety greater than that of lithium metal.

For the negative electrode active material, an alloy-based material that enables charge-discharge reactions by an alloying reaction and a dealloying reaction with carrier ions can be used, other than the above carbon materials. In the case where carrier ions are lithium ions, a material containing at least one of Mg, Ca, Al, Si, Ge, Sn, Pb, As, Sb, Bi, Ag, Au, Zn, Cd, Hg, In, and the like can be used as such an alloy-based material, for example. Such elements have a higher capacity than carbon. In particular, silicon has a significantly high theoretical capacity of 4200 mAh/g. For this reason, silicon is preferably used as the negative electrode active material. As the alloy-based material using such elements, for example, there are $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, $InSb$, $SbSn$, and the like.

Furthermore, as the negative electrode active material, an oxide such as SiO, SnO, $SnO_2$, titanium dioxide ($TiO_2$), lithium titanium oxide ($Li_4Ti_5O_{12}$), a lithium-graphite intercalation compound ($Li_xC_6$), niobium pentoxide ($Nb_2O_5$), tungsten oxide ($WO_2$), or molybdenum oxide ($MoO_2$) can be used.

Note that SiO refers to the powder of a silicon oxide including a silicon-rich portion and can also be referred to as $SiO_y$ (2>y>0). For example, SiO includes a material containing one or more of $Si_2O_3$, $Si_3O_4$, or $Si_2O$ and a mixture of Si powder and silicon dioxide ($SiO_2$). Furthermore, SiO may contain another element (carbon, nitrogen, iron, aluminum, copper, titanium, calcium, manganese, or the like). In other words, SiO refers to a material containing two or more selected from single crystal Si, amorphous Si, polycrystalline Si, $Si_2O_3$, $Si_3O_4$, $Si_2O$, and $SiO_2$ and is a colored material. It can be distinguished from $SiO_x$ (X is 2 or more), which not SiO and is clear and colorless or white. Note that in the case where a secondary battery is fabricated using SiO as a material of the secondary battery and the SiO is oxidized because of repeated charge and discharge, it is changed into $SiO_2$ in some cases.

Furthermore, as the negative electrode active material, $Li_{3-x}M_xN$ (M=Co, Ni, Cu) with a $Li_3N$ type structure, which is a double nitride of lithium and a transition metal, can be used. For example, $Li_{2.6}Co_{0.4}N_3$ is preferable because of its high charge and discharge capacity (900 mAh/g, 1890 mAh/cm$^3$).

A double nitride of lithium and a transition metal is preferably used, in which case lithium ions are contained in the negative electrode active materials and thus the negative electrode active materials can be used in combination with a material that does not contain lithium ions, such as $V_2O_5$ or $Cr_3O_8$, as a positive electrode active material. Note that even in the case of using a material containing lithium ions as a positive electrode active material, the double nitride of lithium and a transition metal can be used as the negative electrode active material by extracting the lithium ions contained in the positive electrode active material in advance.

Furthermore, a material that causes a conversion reaction can be used as the negative electrode active material. For example, a transition metal oxide that does not cause an alloying reaction with lithium, such as cobalt oxide (CoO), nickel oxide (NiO), and iron oxide (FeO), may be used as the negative electrode active material. As the material which causes a conversion reaction, in addition, oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$ cause a conversion reaction. Note that the above fluorides can be used as a positive electrode active material because of their high potentials.

Furthermore, the negative electrode active material layer may include a binder for increasing adhesion of active materials, a conductive additive for increasing the conductivity of the negative electrode active material layer, and the like in addition to the above negative electrode active material.

In this embodiment, as for the structure of the secondary battery, for example, the thickness of the positive electrode current collector is greater than or equal to approximately 10 µm and less than or equal to approximately 40 µm, the thickness of the positive electrode active material layer is greater than or equal to approximately 50 um and less than or equal to approximately 100 µm, the thickness of the negative electrode active material layer is greater than or equal to approximately 50 µm and less than or equal to approximately 100 µm, and the thickness of the negative electrode current collector is greater than or equal to approximately 5 µm and less than or equal to approximately 40 µm.

Note that the cell 100 with a rectangular column shape is illustrated in FIG. 1(A); however, the shape of the cell 100 is not limited thereto. For example, as illustrated in FIG. 1(C), the cell 100 may have a cylindrical column shape. In the case where the cell 100 has a cylindrical column shape, the diameter of the positive electrode current collector 111 and the negative electrode current collector 115 is preferably is 3 cm or less, more preferably 5 mm or less. By making the positive electrode current collector 111 and the negative electrode current collector 115 small, the cell 100 can be small.

Next, FIG. 2(A) shows a perspective view of a secondary battery 200 including the cell 100. FIG. 2(B) shows a cross-sectional view along B1-B2 in FIG. 2(A).

The secondary battery 200 includes three cells 100 connected in series, that is, a cell 100_1, a cell 100_2, and a cell 100_3. In addition, the secondary battery 200 includes a negative electrode terminal 205, a positive electrode terminal 201, a PTC (Positive Temperature Coefficient) 202, an insulator 207, an insulator 208, an insulator 209, and an exterior body 204.

The cell 100_1, the cell 100_2, and the cell 100_3 are electrically connected through a conductive paste 203. In addition, the negative electrode current collector 115 of the cell 100_1 is electrically connected to the negative electrode terminal 205. In addition, the positive electrode current collector 111 of the cell 100_3 is electrically connected to the positive electrode terminal 201 through the PTC 202.

The three cells 100, the PTC 202, part of the negative electrode terminal 205, and part of the positive electrode terminal 201 are surrounded by the insulator 207, the insulator 208, and the insulator 209. Furthermore, the insulator 207, the insulator 208, and the insulator 209 are surrounded by the exterior body 204.

Note that the cell 100 is sandwiched between the positive electrode current collector 111 and the negative electrode current collector 115 as illustrated in FIG. 2(B); however, part of the electrolytic solution 114 may be included in part of a region that is not sandwiched between the positive electrode active material layer 112 and the negative electrode active material layer 116. Furthermore, the cell 100 may include an insulator 206 in part of a region sandwiched between the positive electrode current collector 111 and the negative electrode current collector 115.

When the secondary battery 200 has a rectangular column shape as illustrated in FIG. 2, the positive electrode current collector 111, the positive electrode active material layer 112, the negative electrode current collector 115, and the negative electrode active material layer 116 can be rectangular. Therefore, processing of the positive electrode current collector 111 and the negative electrode current collector 115 becomes easy and the waste of materials is reduced, which is preferable.

Furthermore, although the secondary battery 200 with a rectangular column shape is illustrated in FIG. 2, one embodiment of the present invention is not limited thereto. For example, the secondary battery 200 may have a cylindrical column shape using the cell 100 with a cylindrical column shape as illustrated in FIG. 3.

Figure 3B:
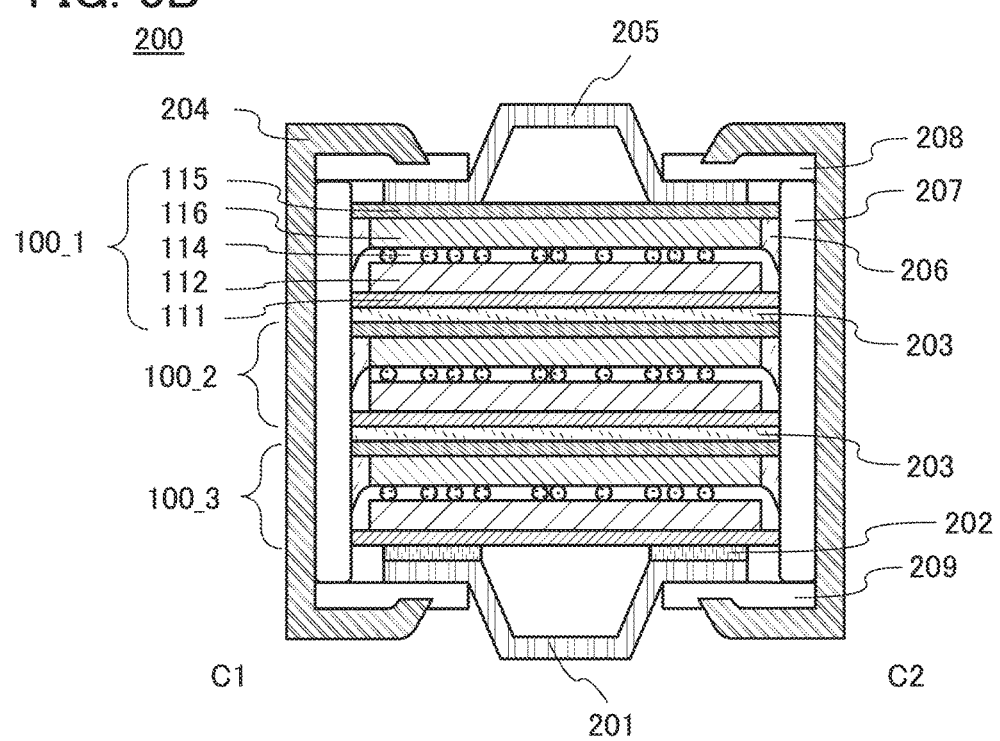

FIG. 3(A) is a perspective view of the secondary battery 200, and FIG. 3(B) is a cross-sectional view along line C1-C2 in FIG. 3(A).

When the secondary battery 200 has a cylindrical column shape, the processing of covering the cell 100 with the exterior body 204 and performing sealing becomes easy, which is preferable.

Figure 4A:
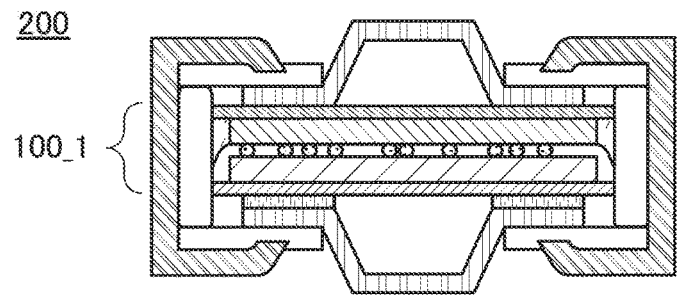
FIG. 4 A cross-sectional view of an example of a secondary battery.
Figure 4B:
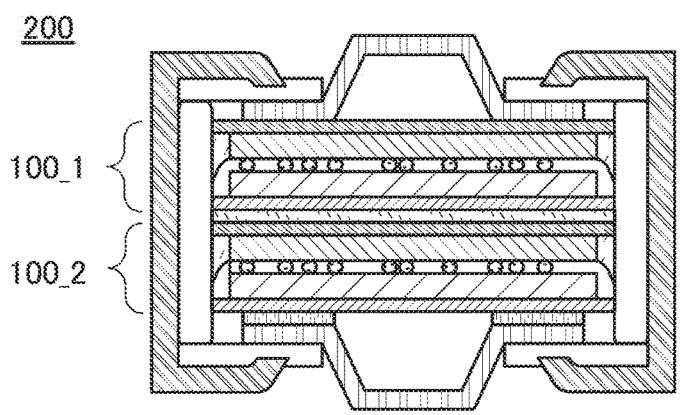
Figure 4C:
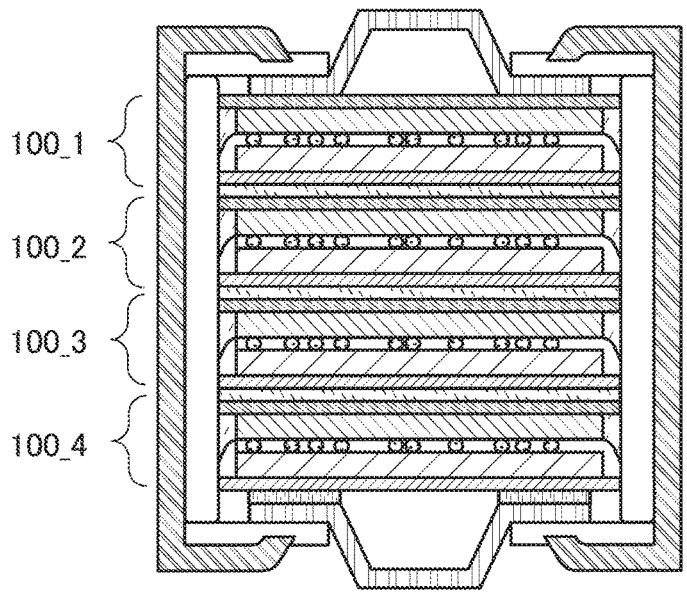

Furthermore, the secondary battery 200 in which three cells 100 are connected in series is illustrated in FIG. 2 and FIG. 3; however, one embodiment of the present invention is not limited thereto. As illustrated in FIG. 4(A), the secondary battery 200 may include one cell 100. Furthermore, as illustrated in FIG. 4(B), the secondary battery 200 may include two cells 100 connected in series. Furthermore, as illustrated in FIG. 4(C), the secondary battery 200 may include four cells 100 connected in series. Moreover, the secondary battery 200 may include five or more cells 100 connected in series. Furthermore, the connection of the cells 100 is not limited to serial connection and may be parallel connection. Connecting the cells 100 in parallel can increase the capacity of the secondary battery 200.

In the case of using a lithium-ion secondary battery as the cell 100, the voltage of one cell is approximately greater than or equal to 3.3 V and less than or equal to 4.2 V. In the case where two cells are stacked as in FIG. 4(B), twice the voltage can be extracted, and in the case where three cells are stacked as in FIG. 3, three times the voltage can be extracted. In this manner, by only changing the number of stacked layers of the cells 100 with the same shape, in manufacture, a secondary battery capable of easily selecting a voltage to be output can be manufactured.

Note that the long side or the diameter of the secondary battery 200 is preferably 3.1 cm or less, more preferably 6 mm or less. When the secondary battery 200 is small, the secondary battery 200 can be mounted on a printed board.

Note that in this embodiment, one embodiment of the present invention is described. Alternatively, one embodiment of the present invention is described in another embodiment. However, one embodiment of the present invention is not limited to them. In other words, various embodiments of the invention are described in this embodiment and the other embodiments; thus, one embodiment of the present invention is not limited to a particular embodiment. The example in which one embodiment of the present invention is applied to a secondary battery is described; however, one embodiment of the present invention is not limited thereto. Depending on circumstances or conditions, one embodiment of the present invention may be applied to a primary battery, a capacitor, an electric double layer capacitor, an ultracapacitor, a supercapacitor, a lithium-ion capacitor, a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, or the like. Alternatively, depending on circumstances or conditions, one embodiment of the present invention does not have to be applied to a secondary battery, for example.

(Embodiment 2)

In this embodiment, one example of a method for manufacturing a secondary battery of one embodiment of the present invention is described using FIG. 5 to FIG. 9.

Figure 5A:
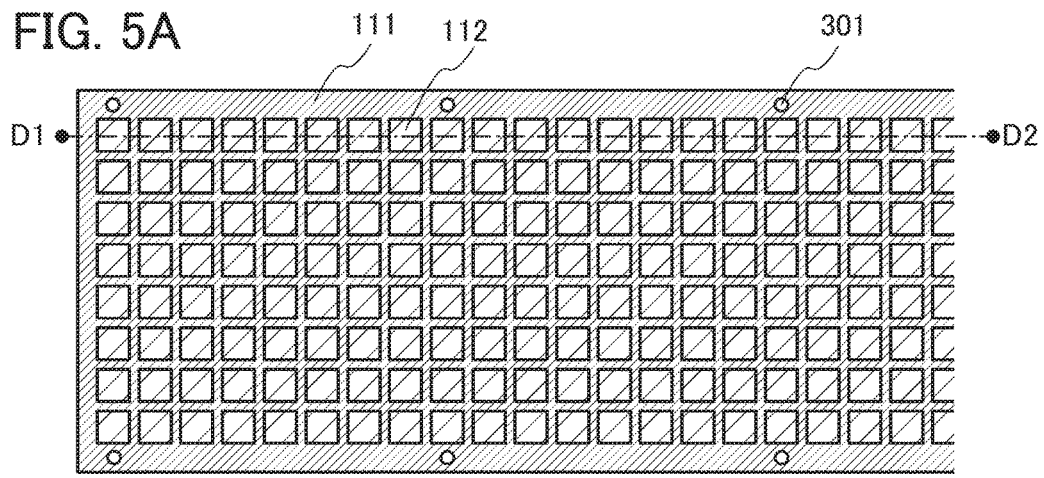
FIG. 5 A top view and a cross-sectional view illustrating an example of a method for manufacturing a secondary battery.
Figure 5B:
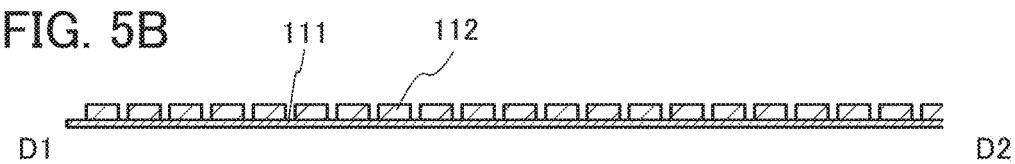

First, a plurality of positive electrode active material layers 112 are formed over the positive electrode current collector 111. At this time, the long side of one of the positive electrode active material layers 112 is preferably 3 cm or less, more preferably 5 mm or less. FIG. 5(A) illustrates the state where the positive electrode active material layers 112 are formed over the positive electrode current collector 111. FIG. 5(B) is a cross-sectional view along D1-D2 in FIG. 5(A).

As a method for forming a plurality of positive electrode active material layers 112 over the positive electrode current collector 111, a printing method such as a screen printing method, a droplet discharging method, and an off-set printing method can be used, for example. Especially, a screen printing method, which allows the positive electrode active material layers 112 to be easily formed thick and requires low cost, is preferable.

Figure 5C:
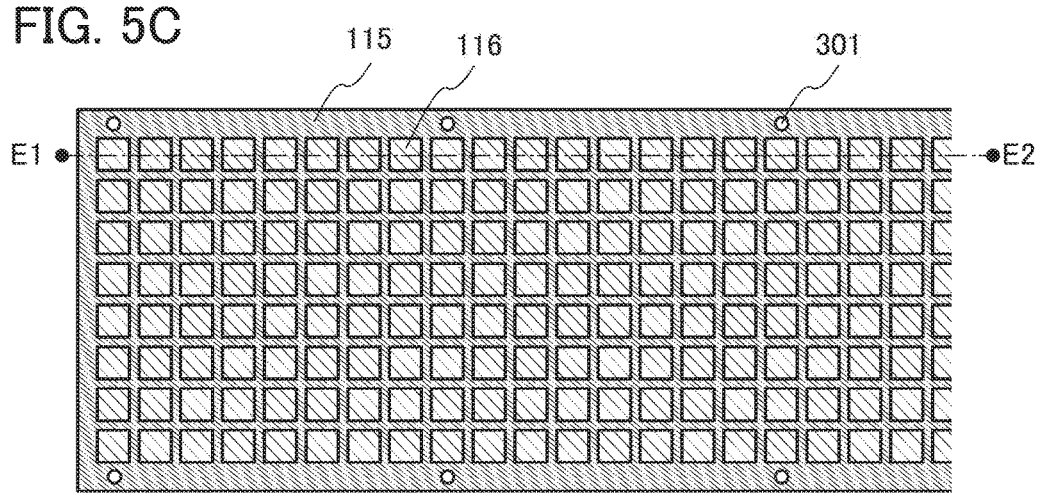
Figure 5D:
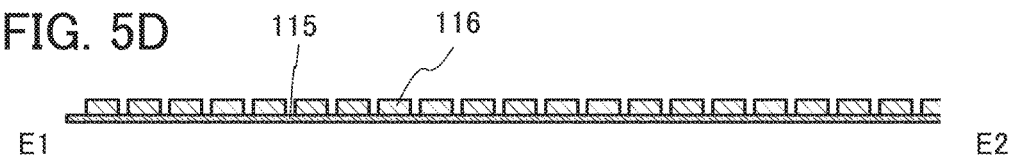

Similarly, a plurality of negative electrode active material layers 116 are formed over the negative electrode current collector 115. At this time, the long side of one of the negative electrode active material layers 116 is preferably 3 cm or less, more preferably 5 mm or less. FIG. 5(C) illustrates the state where the negative electrode active material layers 116 are formed over the negative electrode current collector 115. FIG. 5(D) is a cross-sectional view along E1-E2 in FIG. 5(C).

As a method for forming a plurality of negative electrode active material layers 116 over the negative electrode current collector 115, the same method as the method for forming a plurality of positive electrode active material layers 112 over the positive electrode current collector 111 is used.

Note that a hole 301 that is used in alignment in a later step is preferably provided in the positive electrode current collector 111 and the negative electrode current collector 115.

Furthermore, FIG. 5 illustrates the example in which the top surface shape of the plurality of positive electrode active material layers 112 and the plurality of negative electrode active material layers 116 is a rectangle; however, one embodiment of the present invention is not limited thereto. The top surface shape of the plurality of positive electrode active material layers 112 and the plurality of negative electrode active material layers 116 may be a circle as illustrated in FIG. 6, for example.

Figure 6A:
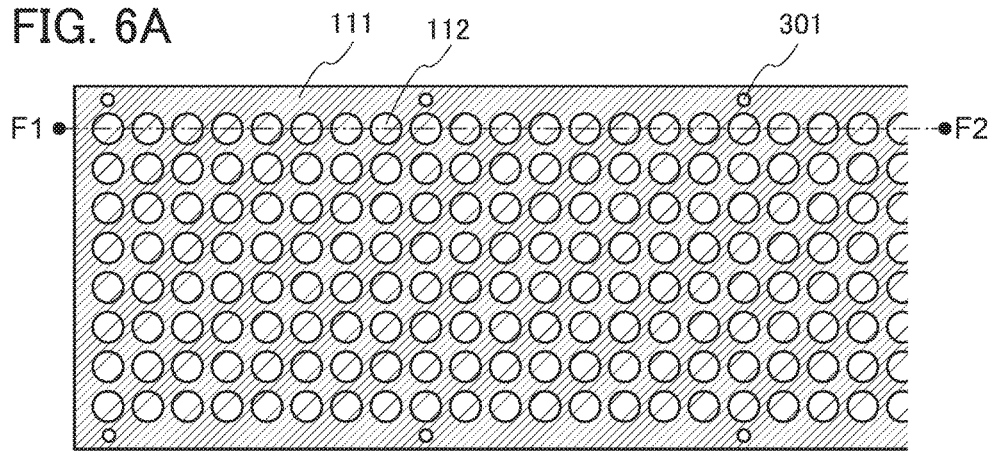
FIG. 6 A top view and a cross-sectional view illustrating an example of a method for manufacturing a secondary battery.
Figure 6B:
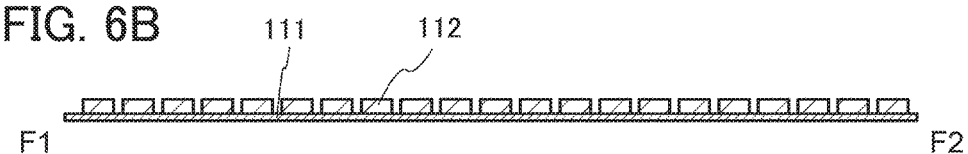
Figure 6C:
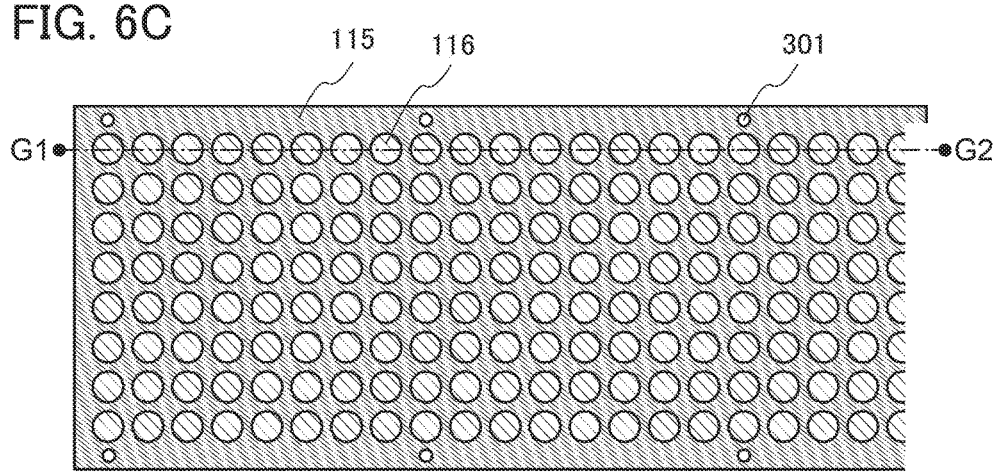
Figure 6D:
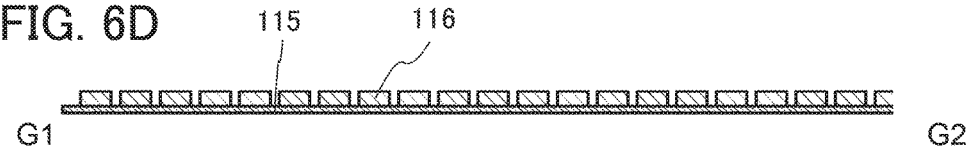

Note that FIG. 6(A) illustrates the state where the positive electrode active material layers 112 are formed over the positive electrode current collector 111. FIG. 6(B) is a cross-sectional view along F1-F2 in FIG. 6(A). Furthermore, FIG. 6(C) illustrates the state where the plurality of negative electrode active material layers 116 are formed over the negative electrode current collector 115. FIG. 6(D) is a cross-sectional view along G1-G2 in FIG. 6(C).

Next, the electrolytic solution 114 that includes the spacers 113, a polymer, an electrolyte, and a solvent and is formed in the form of a sheet is formed. The polymer included in the electrolytic solution 114 enables gelation of the electrolytic solution 114, and it can be formed in the form of a sheet.

Figure 7A:
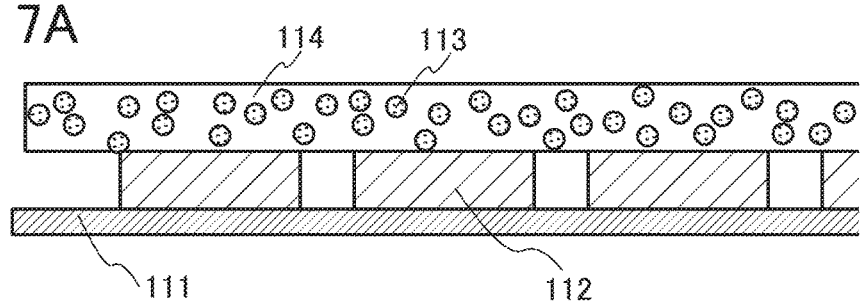
FIG. 7 A cross-sectional view illustrating an example of a method for manufacturing a secondary battery.

Next, the sheet-like gelled electrolytic solution 114 including the spacers 113 is positioned over the positive electrode current collector 111 (FIG. 7(A)). At this time, it is positioned such that the plurality of positive electrode active material layers 112 formed over the positive electrode current collector 111 are in contact with the electrolytic solution 114.

Figure 7B:
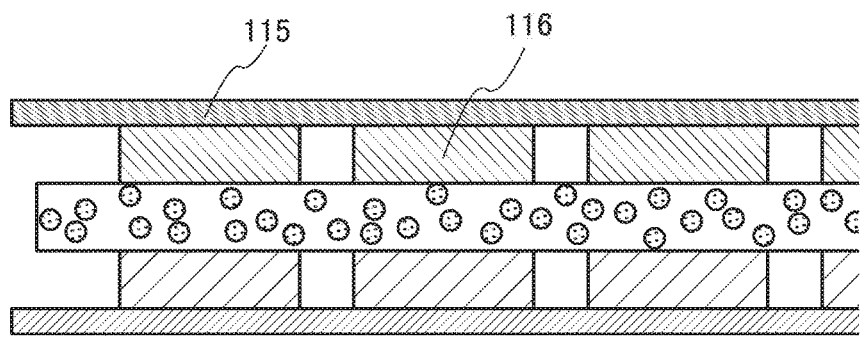

Next, the negative electrode current collector 115 is positioned over the electrolytic solution 114 (FIG. 7(B)). At this time, it is positioned such that the electrolytic solution 114 and the negative electrode active material layers 116 formed over the negative electrode current collector 115 are in contact with each other. Furthermore, placement is performed such that the plurality of positive electrode active material layers 112 and the plurality of negative electrode active material layers 116 overlap with each other. At this time, the hole 301 for alignment provided in the positive electrode current collector 111 and the negative electrode current collector 115 can be used.

Figure 7C:
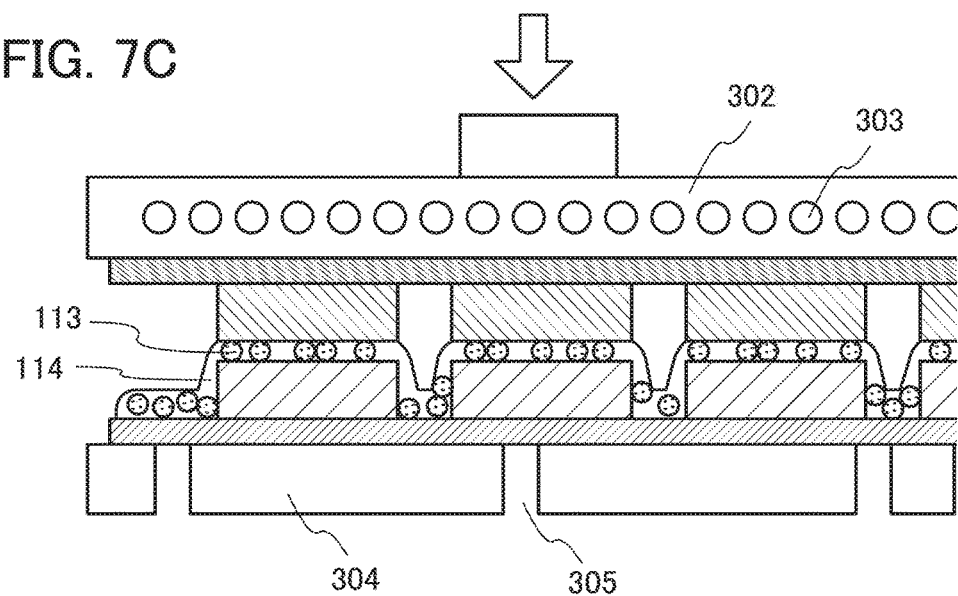

Then, the positive electrode current collector 111, the electrolytic solution 114, and the negative electrode current collector 115 are sandwiched between a lower mold 304 and an upper mold 302 of a press machine, and pressure is applied (FIG. 7(C)). A plurality of air holes 305 for suction fixing of current collectors are preferably provided in the lower mold 304. Furthermore, a heater 303 is preferably provided in the upper mold 302, and heating is preferably performed concurrently with pressure application.

Note that as illustrated in FIG. 7(C), heating and pressure application change the form of the sheet-like electrolytic solution 114, and the distance between the positive electrode active material layer 112 and the negative electrode active material layer 116 is substantially equal to the diameter or a shortest part of the spacer 113. Furthermore, part of the electrolytic solution 114 may be moved to part of a region that is not sandwiched between the positive electrode active material layer 112 and the negative electrode active material layer 116 by heating and pressure application.

Figure 8A:
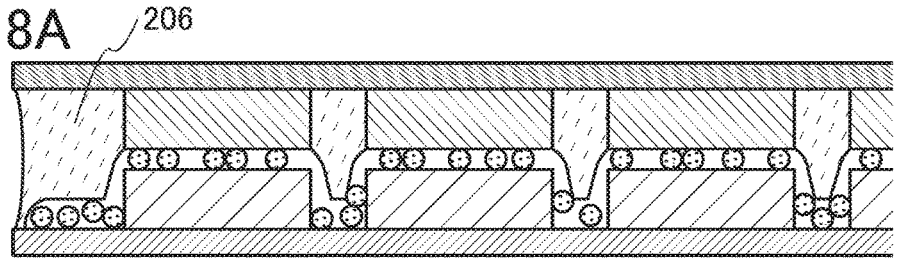
FIG. 8 A cross-sectional view and a perspective view illustrating an example of a method for manufacturing a secondary battery.

Next, the insulator 206 is introduced into a space sandwiched between the positive electrode current collector 111 and the negative electrode current collector 115 and cured (FIG. 8(A)). For example, the pressure in the space sandwiched between the positive electrode current collector 111 and the negative electrode current collector 115 is reduced, and the insulator 206 having fluidity increased by heating is introduced, cooled, and cured.

As the insulator 206, a resin with thermoplasticity, such as polypropylene, polyethylene, polystyrene, polyvinyl chloride, polyvinylidene chloride, polyester, or polyamide, is preferably used. Furthermore, a resin with high moisture resistance allows easier handling of the fabricated cell; thus, it is particularly preferable to use polyvinylidene chloride, polyethylene, and polypropylene.

As illustrated in FIG. 8(A), by this step, the insulator 206 is formed in a region that is sandwiched between the positive electrode current collector 111 and the negative electrode current collector 115 and is other than a portion occupied by the positive electrode active material layers 112, the electrolytic solution 114, and the negative electrode active material layers 116.

Figure 8B:
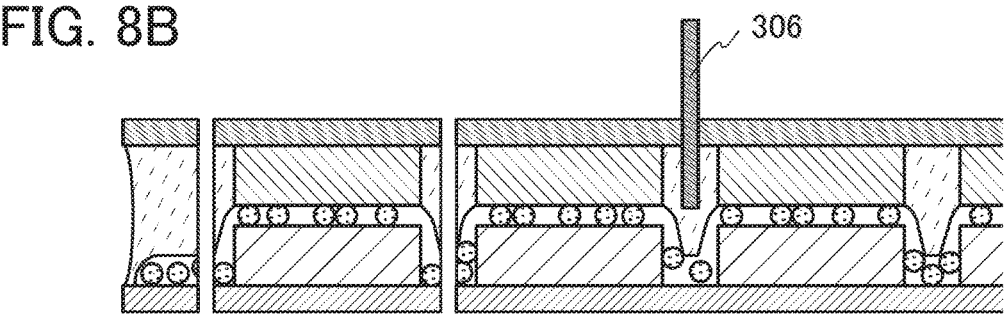

Next, the positive electrode current collector 111, the electrolytic solution 114, the negative electrode current collector 115, and the insulator 206 are cut between the plurality of positive electrode active material layers 112 and the negative electrode active material layers 116 (FIG. 8(B)).

The cutting can be performed with a dicing saw 306 as illustrated in FIG. 8(A) when the positive electrode active material layers 112 and the negative electrode active material layers 116 are formed to be rectangular. Furthermore, a laser saw or the like may be used. When the positive electrode active material layers 112 and the negative electrode active material layers 116 are formed to be circular, cutting into a circle can be performed with a punching machine or the like.

By this step, the plurality of positive electrode active material layers 112 and negative electrode active material layers 116 are separated, and a plurality of cells 100 are fabricated.

Figure 8C:
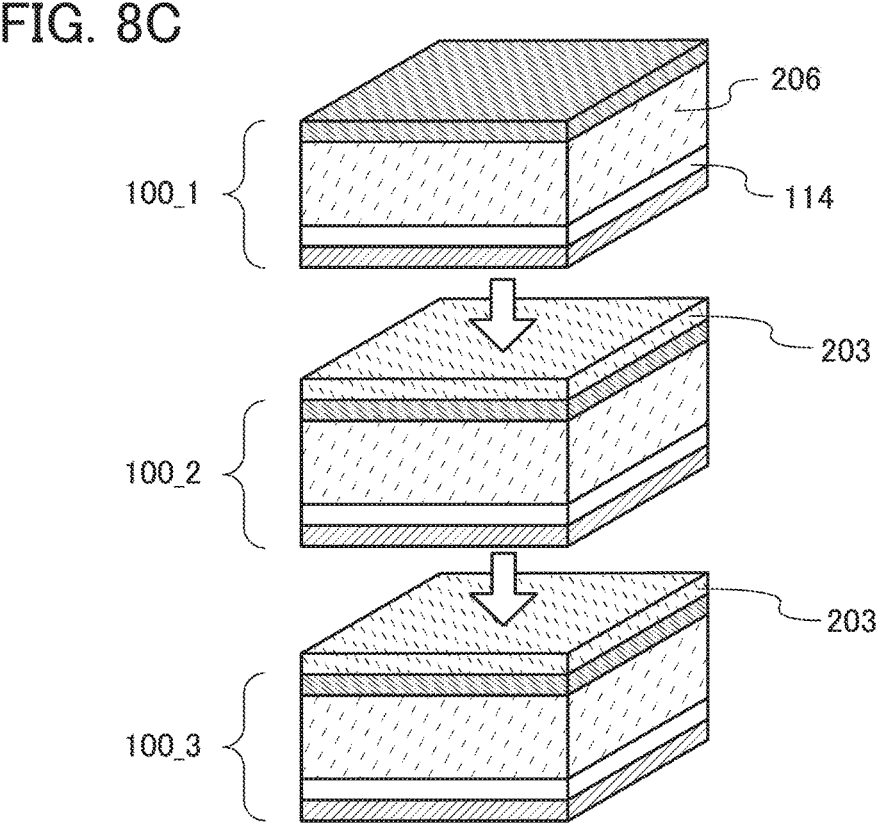

Then, the plurality of cells 100 are electrically connected through the conductive paste 203 (FIG. 8(C)). FIG. 8(C) illustrates an example in which three cells 100, that is, the cell 100_1 the cell 100_2, and the cell 100_3 are connected in series.

As the conductive paste, a material in which particles of aluminum, copper, gold, silver, carbon black, graphite, lead, or the like are dispersed into a resin can be used. Especially, a conductive paste including aluminum or copper is preferable because migration is unlikely to occur.

Figure 9:
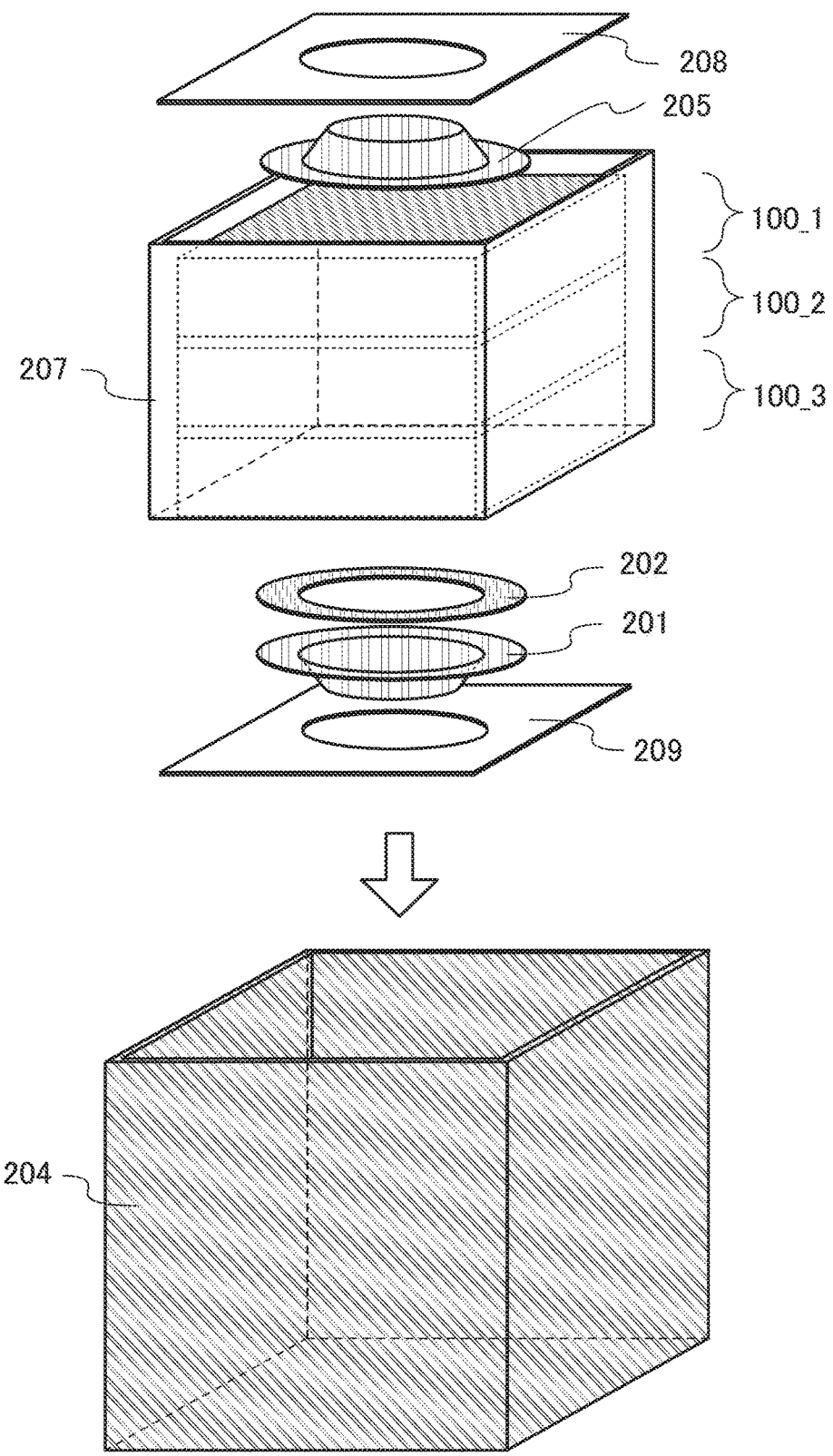
FIG. 9 A perspective view illustrating an example of a method for manufacturing a secondary battery.

Next, the cell 100_1, the cell 100_2, and the cell 100_3 that are electrically connected are covered with the insulator 207 (FIG. 9). Note that FIG. 9 illustrates the insulator 207 with a rectangular column shape; however, when the cell 100 has a cylindrical column shape, the insulator 207 has a cylindrical column shape.

Furthermore, the negative electrode terminal 205 is positioned so as to be in contact with the negative electrode current collector 115 of the cell 100_1, and the negative electrode terminal 205 is partly covered with the insulator 208. Furthermore, the PTC 202 is positioned in contact with the positive electrode current collector 111 of the cell 100_3, and the positive electrode terminal 201 is positioned in contact with the PTC 202. Furthermore, the PTC 202 and the positive electrode terminal 201 are partly covered with the insulator 209.

Figure 10A:
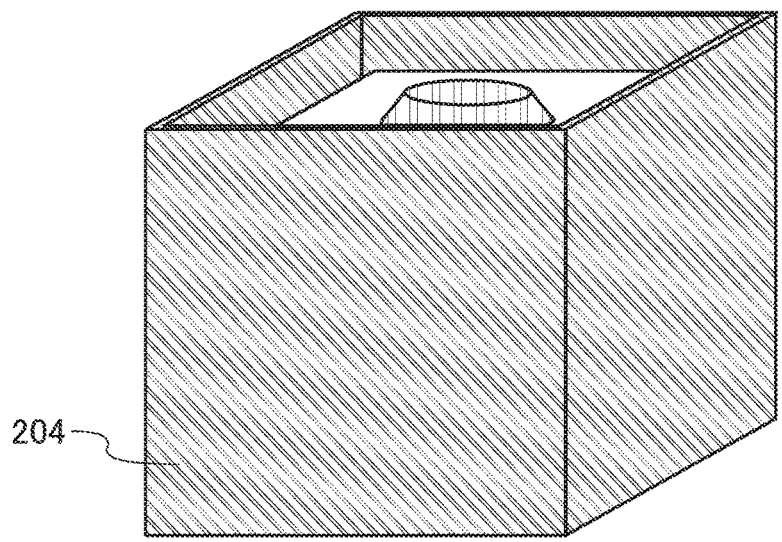
FIG. 10 A perspective view illustrating an example of a method for manufacturing a secondary battery.

Furthermore, the cell 100_1, the cell 100_2, the cell 100_3, the insulator 208, the PTC 202, the insulator 209, part of the negative electrode terminal 205, and part of the positive electrode terminal 201 are covered with the exterior body 204 (FIG. 10(A)).

Figure 10B:
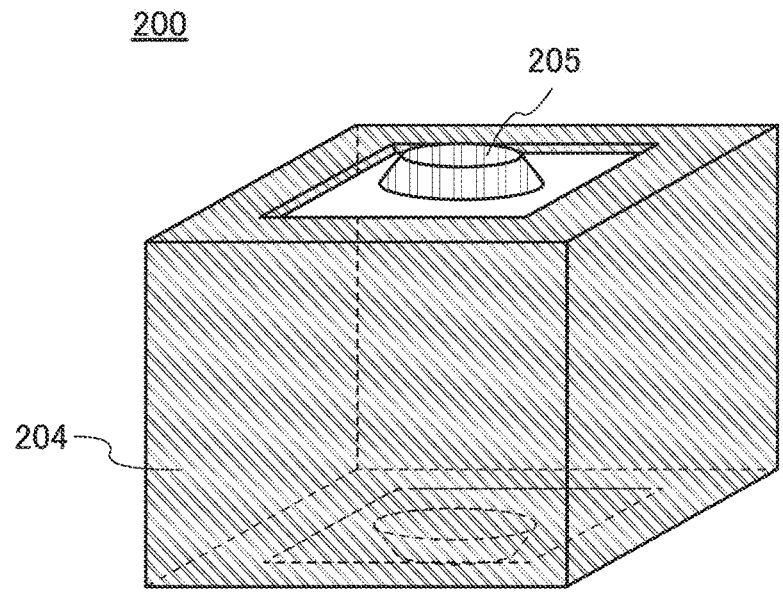

Next, upper and lower end portions of the exterior body 204 are crimped (FIG. 10(B)). Through the above process, the secondary battery 200 can be fabricated.

Note that in the case where the secondary battery 200 with a cylindrical column shape is fabricated using the cell 100 with a cylindrical column shape, it is easy to crimp the upper and lower end portions of the exterior body 204, which is preferable.

This embodiment can be implemented in combination with the other embodiments.

(Embodiment 3)

A battery management unit (Battery Management Unit: BMU) that can be used in combination with the secondary battery described in the above embodiment and transistors that are suitable for a circuit included in the battery management unit are described with reference to FIG. 11 to FIG. 17. In this embodiment, in particular, a battery management unit of a power storage device including batteries connected in series, for example, a power storage device in which the secondary batteries 200 illustrated in FIG. 4(A) are connected in series is described.

When the plurality of batteries connected in series are repeatedly charged and discharged, there occur variations in charge and discharge characteristics among the batteries, which causes variations in capacity (output voltage) among the batteries. The capacity in discharge of all the batteries connected in series depends on the battery with a low capacity. The variations in capacity among the batteries reduce the capacity in discharge of all the batteries. Furthermore, when charge is performed based on the battery with a low capacity, an undercharge might be caused. In addition, when charge is performed based on the battery with a high capacity, an overcharge might be caused.

Thus, the battery management unit of the power storage device including the batteries connected in series has a function of reducing variations in capacity among the batteries, which cause an undercharge and an overcharge. As a circuit configuration for eliminating variations in capacity among batteries, there is a resistive type, a capacitive type, an inductive type, or the like, and a circuit configuration that can reduce variations in capacity using transistors with a low off-state current is explained here as an example.

A transistor including an oxide semiconductor in its channel formation region (an OS transistor) is preferable as the transistor with a low off-state current. When an OS transistor with a low off-state current is used in the circuit configuration of the battery management unit of the power storage device, the amount of charge that leaks from a battery can be reduced, and reduction in capacity with the lapse of time can be suppressed.

As the oxide semiconductor used in the channel formation region, an In-M-Zn oxide (M is Ga, Sn, Y, Zr, La, Ce, or Nd) is used. In the case where the atomic ratio of the metal elements of a target used for forming an oxide semiconductor film is In:M:Zn=$x_1$:$y_1$:$z_1$, $x_1/y_1$ is preferably greater than or equal to 1/3 and less than or equal to 6, more preferably greater than or equal to 1 and less than or equal to 6, and $z_1/y_1$ is preferably greater than or equal to 1/3 and less than or equal to 6, more preferably greater than or equal to 1 and less than or equal to 6. Note that when $z_1/y_1$ is greater than or equal to 1 and less than or equal to 6, a CAAC-OS film as the oxide semiconductor film is easily formed.

Here, the CAAC-OS film is described.

A CAAC-OS film is one of the oxide semiconductor films having a plurality of c-axis aligned crystal parts.

By observing a combined analysis image (also referred to as a high-resolution TEM image) of a bright-field image and a diffraction pattern of a CAAC-OS film, using a transmission electron microscope (TEM: Transmission Electron Microscope), a plurality of crystal parts can be observed. However, even in the high-resolution TEM image, a boundary between crystal parts, that is, a grain boundary (also referred to as a grain boundary) cannot be clearly observed. Thus, it can be said that in the CAAC-OS film, a reduction in electron mobility due to the grain boundary is less likely to occur.

When the high-resolution TEM image of a cross section of the CAAC-OS film is observed in the direction substantially parallel to the sample surface, it can be found that metal atoms are arranged in a layered manner in the crystal parts. Each metal atom layer has a shape that reflects unevenness of a surface over which the CAAC-OS film is formed (also referred to as a formation surface) or the top surface of the CAAC-OS film, and is arranged parallel to the formation surface or the top surface of the CAAC-OS film.

On the other hand, when the high-resolution TEM image of a plane surface of the CAAC-OS film is observed in the direction substantially perpendicular to the sample surface, it can be found that metal atoms are arranged in a triangular or hexagonal arrangement in the crystal parts. However, there is no regularity of arrangement of metal atoms between different crystal parts.

When the structure of a CAAC-OS film is analyzed with an X-ray diffraction (XRD: X-Ray Diffraction) apparatus, for example, in analysis of a CAAC-OS film including an InGaZnO$_4$ crystal by an out-of-plane method, a peak may appear at a diffraction angle (2θ) of around 31°. This peak is derived from the (009) plane of the InGaZnO$_4$ crystal; thus, it can be found that crystals in the CAAC-OS film have c-axis alignment and the c-axes are oriented in the direction substantially perpendicular to the formation surface or the top surface.

Note that in analysis of the CAAC-OS film including an InGaZnO$_4$ crystal by an out-of-plane method, another peak may appear when 2θ is around 36°, in addition to the peak at 2θ of around 31°. The peak at 2θ of around 36° indicates that a crystal having no c-axis alignment is included in part of the CAAC-OS film. It is preferable that in the CAAC-OS film, a peak appear when 2θ is around 31° and that a peak not appear when 2θ is around 36°.

The CAAC-OS film is an oxide semiconductor film with low impurity concentration. The impurity is an element other than the main components of the oxide semiconductor film, such as hydrogen, carbon, silicon, and a transition metal element. In particular, an element, specifically, silicon or the like, which has higher strength of bonding to oxygen than a metal element included in an oxide semiconductor film deprives the oxide semiconductor film of oxygen, which results in disorder of the atomic arrangement and reduced crystallinity of the oxide semiconductor film. Furthermore, a heavy metal such as iron or nickel, argon, carbon dioxide, or the like has a large atomic radius (molecular radius), and thus causes disorder of the atomic arrangement and reduced crystallinity of the oxide semiconductor film when it is contained in the oxide semiconductor film. Note that the impurity contained in the oxide semiconductor film might serve as a carrier trap or a carrier generation source.

Furthermore, the CAAC-OS film is an oxide semiconductor having a low density of defect states. In some cases, oxygen vacancies in the oxide semiconductor film serve as carrier traps or serve as carrier generation sources when hydrogen is captured therein, for example.

The state in which impurity concentration is low and density of defect states is low (oxygen vacancies are few) is referred to as highly purified intrinsic or substantially highly purified intrinsic. A highly purified intrinsic or substantially highly purified intrinsic oxide semiconductor has few carrier generation sources, and thus can have a low carrier density. Therefore, a transistor using the oxide semiconductor film rarely has an electrical characteristic of a negative threshold voltage (also referred to as normally on). Furthermore, the highly purified intrinsic or substantially highly purified intrinsic oxide semiconductor film has few carrier traps. Accordingly, the transistor using the oxide semiconductor film has little variation in electrical characteristics and high reliability. Note that charge trapped by the carrier traps in the oxide semiconductor film takes a long time to be released and might behave like fixed charge. Thus, the transistor using the oxide semiconductor film having high impurity concentration and a high density of defect states has unstable electrical characteristics in some cases.

Furthermore, a transistor using the CAAC-OS film has small variations in the electrical characteristics of the transistor due to irradiation with visible light or ultraviolet light.

Note that since the OS transistor has a wider band gap than a transistor including silicon in its channel formation region (a Si transistor), dielectric breakdown is unlikely to occur when a high voltage is applied. Although a voltage of several hundreds of V is generated when batteries are connected in series, the above-described OS transistor is suitable for being included in a circuit of a battery management unit which is used for such batteries in the power storage device.

Figure 11:
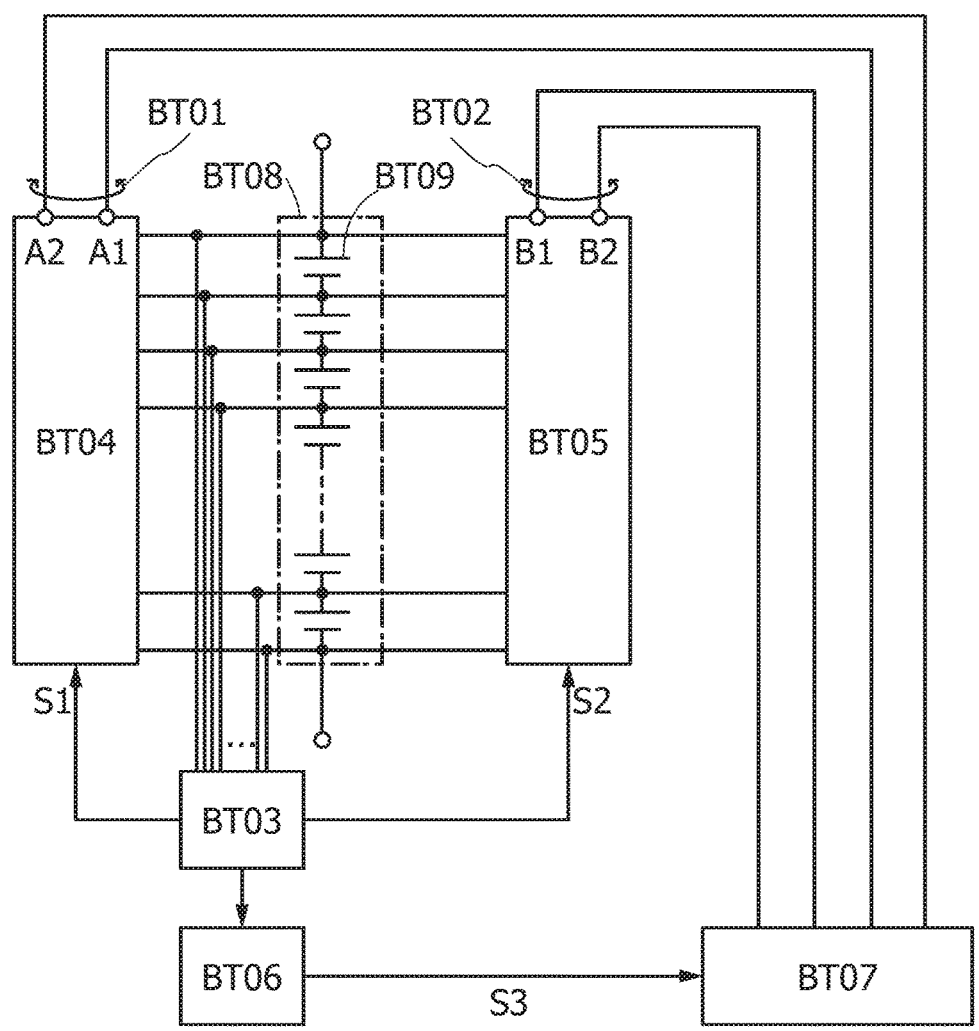
FIG. 11 A block diagram illustrating a battery management unit of a power storage device.

FIG. 11 shows an example of a block diagram of the power storage device. A power storage device BT00 illustrated in FIG. 11 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BT08 including a plurality of batteries BT09 connected in series.

In addition, in the power storage device BT00 illustrated in FIG. 11, a portion composed of the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically, the switching control circuit BT03 determines batteries to be discharged (a discharge battery group) and batteries to be charged (a charge battery group) based on voltage measured for every battery BT09.

Furthermore, the switching control circuit BT03 outputs a control signal S1 and a control signal S2 on the basis of the determined discharge battery group and charge battery group. The control signal S1 is output to the switching circuit BT04. The control signal S1 is a signal that controls the switching circuit BT04 so that the terminal pair BT01 and the discharge battery group are connected. In addition, the control signal S2 is output to the switching circuit BT05. The control signal S2 is a signal that controls the switching circuit BT05 so that the terminal pair BT02 and the charge battery group are connected.

Furthermore, the switching control circuit BT03 generates the control signal S1 and the control signal S2 on the basis of the configuration of the switching circuit BT04, the switching circuit BT05, and the voltage transformer circuit BT07 so that terminals having the same polarity are connected with each other between the terminal pair BT01 and the discharge battery group or between the terminal pair BT02 and the charge battery group.

The operations of the switching control circuit BT03 are described in detail.

First, the switching control circuit BT03 measures the voltage of each of the plurality of batteries BT09. Then, the switching control circuit BT03 determines that the battery BT09 having a voltage higher than or equal to a predetermined threshold value is a high-voltage battery (high-voltage cell) and that the battery BT09 having a voltage lower than the predetermined threshold value is a low-voltage battery (low-voltage cell), for example.

Note that as a method to determine a high-voltage cell and a low-voltage cell, various methods can be used. For example, the switching control circuit BT03 may determine whether each battery BT09 is a high-voltage cell or a low-voltage cell on the basis of the voltage of the battery BT09 having the highest voltage or the lowest voltage among the plurality of batteries BT09. In this case, the switching control circuit BT03 can determine whether each battery BT09 is a high-voltage cell or a low-voltage cell by, for example, determining whether or not the ratio of the voltage of each battery BT09 to the reference voltage is the predetermined ratio or more. Then, the switching control circuit BT03 determines a charge battery group and a discharge battery group on the basis of the determination result.

Note that high-voltage cells and low-voltage cells can be mixed in various states in the plurality of batteries BT09. For example, the switching control circuit BT03 determines a portion having the largest number of high-voltage cells connected in series as the discharge battery group of mixed high-voltage cells and low-voltage cells. Furthermore, the switching control circuit BT03 determines a portion having the largest number of low-voltage cells connected in series as the charge battery group. In addition, the switching control circuit BT03 may preferentially select the batteries BT09 which are almost overcharged or over-discharged as the discharge battery group or the charge battery group.

Here, operation examples of the switching control circuit BT03 in this embodiment will be described using FIG. 12. FIG. 12 is a diagram for illustrating the operation examples of the switching control circuit BT03. Note that FIG. 12 illustrates the case where four batteries BT09 are connected in series as an example for convenience of explanation.

Figure 12A:
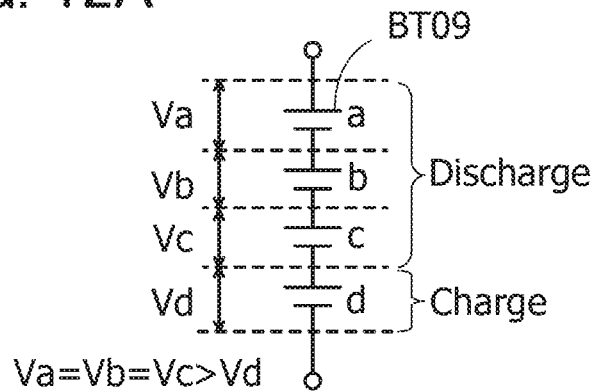
FIG. 12 A conceptual diagram illustrating a battery management unit of a power storage device.

First, in the example of FIG. 12(A), the case where the relation of Va=Vb=Vc>Vd is satisfied where the voltages of batteries a to d are the voltage Va to the voltage Vd is shown. That is, a series of three high-voltage cells a to c and one low-voltage cell d are connected in series. In this case, the switching control circuit BT03 determines the series of three high-voltage cells a to c as the discharge battery group (indicated by "Discharge" in the drawing, the same applies to the description below). In addition, the switching control circuit BT03 determines the low-voltage cell d as the charge battery group (indicated by "Charge" in the drawing, the same applies to the description below).

Figure 12B:
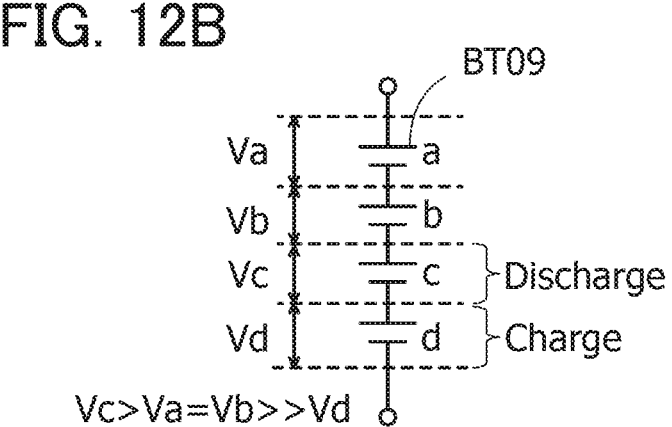

Next, in the example of FIG. 12(B), the case of the relation of Vc>Va=Vb>>Vd is shown. That is, a series of two low-voltage cells a and b, one high-voltage cell c, and one low-voltage cell d which is almost over-discharged are connected in series. In this case, the switching control circuit BT03 determines the high-voltage cell c as the discharge battery group. Furthermore, since the low-voltage cell d is almost over-discharged, the switching control circuit BT03 preferentially determines the low-voltage cell d as the charge battery group instead of the series of two low-voltage cells a and b.

Figure 12C:
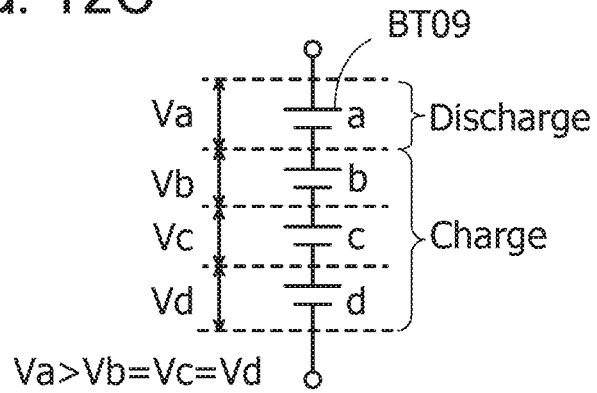

Lastly, in the example of FIG. 12(C), the case of the relation of the Va>Vb=Vc=Vd is shown. That is, one high-voltage cell a and a series of three low-voltage cells b to d are connected in series. In this case, the switching control circuit BT03 determines the high-voltage cell a as the discharge battery group. In addition, the switching control circuit BT03 determines the series of three low-voltage cells b to d as the charge battery group.

On the basis of the determination result shown in the above examples of FIGS. 12(A) to (C), the switching control circuit BT03 outputs the control signal S1, in which information showing the discharge battery group as the connection destination of the switching circuit BT04 is set, and the control signal S2, in which information showing the charge battery group as the connection destination of the switching circuit BT05 is set, to the switching circuit BT04 and the switching circuit BT05, respectively.

The above is the description regarding the details of the operations of the switching control circuit BT03.

The switching circuit BT04 sets the connection destination of the terminal pair BT01 at the discharge battery group determined by the switching control circuit BT03, in response to the control signal S1 output from the switching control circuit BT03.

The terminal pair BT01 is composed of a pair of terminals A1 and A2. The switching circuit BT04 sets the connection destination of the terminal pair BT01 by connecting one of the terminals A1 and A2 to a positive electrode terminal of the battery BT09 positioned on the most upstream side (the high potential side) of the discharge battery group, and the other to a negative electrode terminal of the battery BT09 positioned on the most downstream side (the low potential side) of the discharge battery group. Note that the switching circuit BT04 can recognize the position of the discharge battery group, using the information set in the control signal S1.

The switching circuit BT05 sets the connection destination of the terminal pair BT02 at the charge battery group determined by the switching control circuit BT03, in response to the control signal S2 output from the switching control circuit BT03.

The terminal pair BT02 is composed of a pair of terminals B1 and B2. The switching circuit BT05 sets the connection destination of the terminal pair BT02 by connecting one of the terminals B1 and B2 to a positive electrode terminal of the battery BT09 positioned on the most upstream side (the high potential side) of the charge battery group, and the other to a negative electrode terminal of the battery BT09 positioned on the most downstream side (the low potential side) of the charge battery group. Note that the switching circuit BT05 can recognize the position of the charge battery group, using the information set in the control signal S2.

Figure 13:
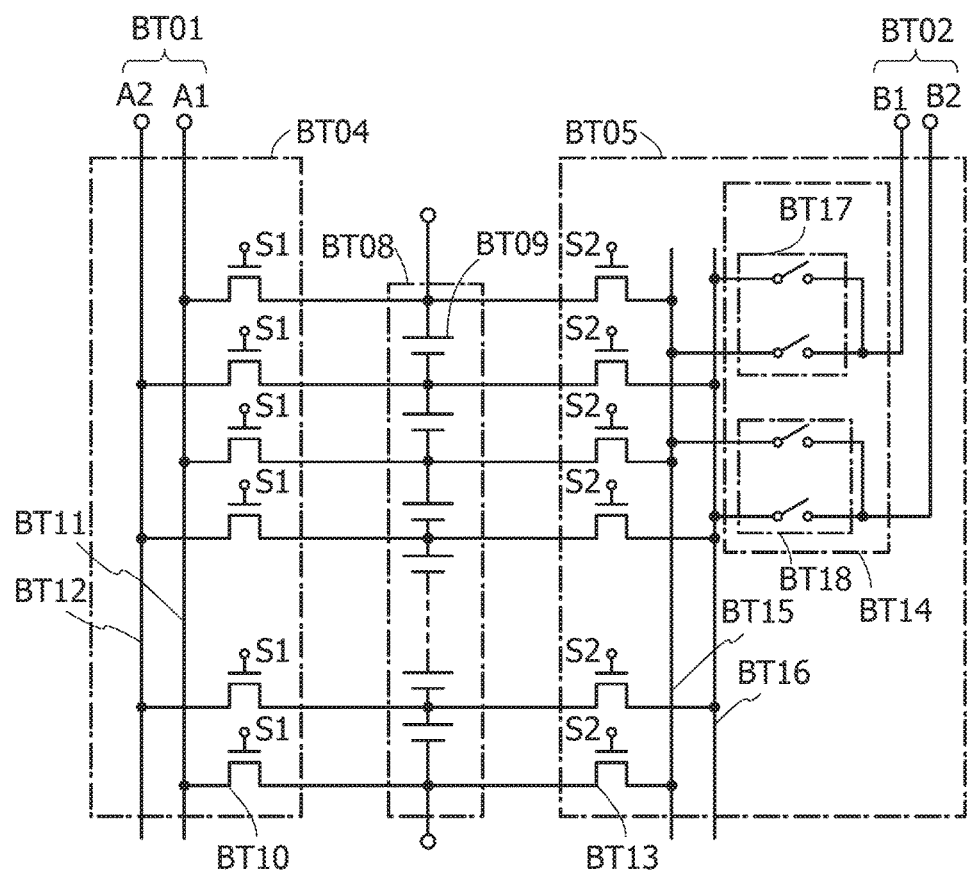
FIG. 13 A circuit diagram illustrating a battery management unit of a power storage device.
Figure 14:
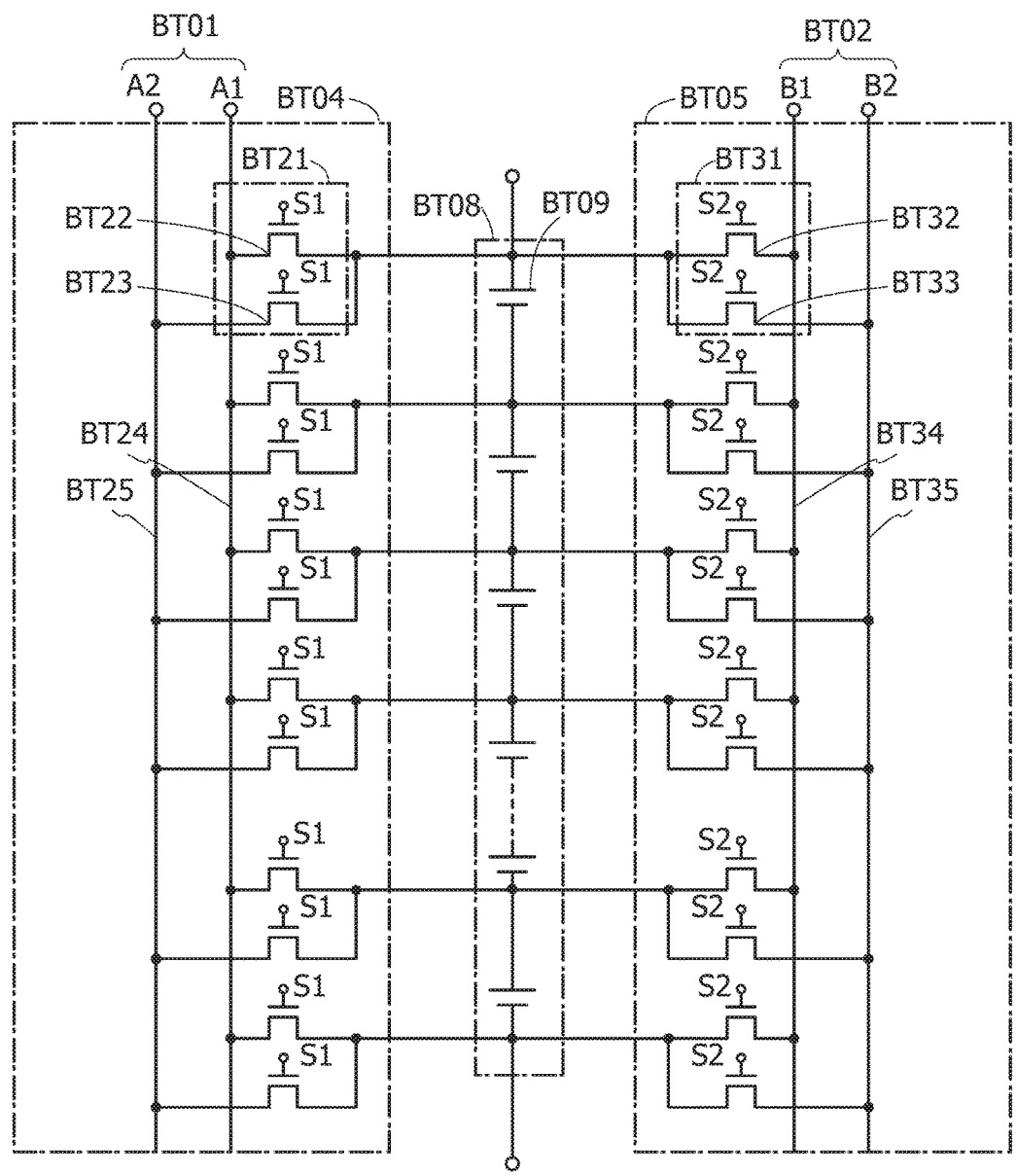
FIG. 14 A circuit diagram illustrating a battery management unit of a power storage device.

FIG. 13 and FIG. 14 show circuit diagrams showing configuration examples of the switching circuits BT04 and BT05.

In FIG. 13, the switching circuit BT04 includes a plurality of transistors BT10, and buses BT11 and BT12. The bus BT11 is connected to the terminal A1. Furthermore, the bus BT12 is connected to the terminal A2. Sources or drains of the plurality of transistors BT10 are connected to the buses BT11 and BT12 alternately. Furthermore, the others of the sources or drains are each connected between two adjacent batteries BT09.

The other of the source or drain of the transistor BT10 positioned on the most upstream side of the plurality of transistors BT10 is connected to the positive electrode terminal of the battery BT09 positioned on the most upstream side of the battery portion BT08. Furthermore, the other of the source or drain of the transistor BT10 positioned on the most downstream side of the plurality of transistors BT10 is connected to the negative electrode terminal of the battery BT09 positioned on the most downstream side of the battery portion BT08.

The switching circuit BT04 connects the discharge battery group and the terminal pair BT01 by bringing one of the plurality of transistors BT10 which are connected to the bus BT11 and one of the plurality of transistors BT10 which are connected to the bus BT12 into an on state in response to the control signal S1 supplied to gates of the plurality of transistors BT10. Accordingly, the positive electrode terminal of the battery BT09 positioned on the most upstream side of the discharge battery group is connected to the terminal A0 or A2 of the terminal pair. In addition, the negative electrode terminal of the battery BT09 on the most downstream side of the discharge battery group is connected to the other terminal A1 or A2 of the terminal pair, i.e., a terminal which is not connected to the positive electrode terminal.

An OS transistor is preferably used as the transistor BT10. Since the off-state current of the OS transistor is low, the amount of charge that leaks from the battery which does not belong to the discharge battery group can be reduced, and reduction in capacity with the lapse of time can be suppressed. In addition, dielectric breakdown is unlikely to occur in the OS transistor when a high voltage is applied. Therefore, the battery BT09 and the terminal pair BT01, which are connected to the transistor BT10 in an off state, can be insulated from each other even when the output voltage of the discharge battery group is high.

In FIG. 13, the switching circuit BT05 includes a plurality of transistors BT13, a current control switch BT14, a bus BT15, and a bus BT16. The buses BT15 and BT16 are placed between the plurality of transistors BT13 and the current control switch BT14. Sources or drains of the plurality of transistors BT13 are connected to the buses BT15 and BT16 alternately. Furthermore, the others of the sources or drains of the plurality of transistors BT13 are each connected between two adjacent batteries BT09.

The source or drain of the transistor BT13 positioned on the most upstream side of the plurality of transistors BT13 is connected to the positive electrode terminal of the battery BT09 positioned on the most upstream side of the battery portion BT08. Furthermore, the other of the source or drain of the transistor BT13 positioned on the most downstream side of the plurality of transistors BT13 is connected to the negative electrode terminal of the battery BT09 positioned on the most downstream side of the battery portion BT08.

An OS transistor is preferably used as the transistors BT13 like the transistors BT10. Since the off-state current of the OS transistor is low, the amount of charge that leaks from the batteries which do not belong to the charge battery group can be reduced, and reduction in capacity with the lapse of time can be suppressed. In addition, dielectric breakdown is unlikely to occur in the OS transistor when a high voltage is applied. Therefore, the battery BT09 and the terminal pair BT02, which are connected to the transistor BT13 in an off state, can be insulated from each other even when a voltage for charging the charge battery group is high.

The current control switch BT14 includes a switch pair BT17 and a switch pair BT18. One end of the switch pair BT17 is connected to the terminal B1. Furthermore, the other end of the switch pair BT17 branches off from two switches; one switch is connected to the bus BT15, and the other switch is connected to the bus BT16. One end of switch pair BT18 is connected to the terminal B2. Furthermore, the other end of the switch pair BT18 branches off from two switches; one switch is connected to the bus BT15, and the other switch is connected to the bus BT16.

OS transistors are preferably used for the switches included in the switch pair BT17 and the switch pair BT18 like the transistors BT10 and BT13.

The switching circuit BIOS connects the charge battery group and the terminal pair BT02 by controlling the combination of on/off states of the transistors BT13 and the current control switch BT14 in response to the control signal S2.

For example, the switching circuit BT05 connects the charge battery group and the terminal pair BT02 in the following manner.

The switching circuit BT05 brings a transistor BT13 connected to the positive electrode terminal of the battery BT09 positioned on the most upstream side of the charge battery group into an on state in response to the control signal S2 supplied to gates of the plurality of transistors BT10. In addition, the switching circuit BT05 brings a switching switch 151 connected to the negative electrode terminal of the battery BT09 positioned on the most downstream side of the charge battery group into an on state in response to the control signal S2 supplied to the gates of the plurality of transistors BT10.

The polarities of voltages applied to the terminal pair BT02 can vary in accordance with the configurations of the discharge battery group connected to the terminal pair BT01, and the voltage transformer circuit BT07. Furthermore, in order to supply a current in the direction for charging the charge battery group, terminals with the same polarity are required to be connected to each other between the terminal pair BT02 and the charge battery group. Thus, a current control switch 152 is controlled by the control signal S2 so that the connection destinations of the switch pair BT17 and the switch pair BT18 are changed in accordance with the polarities of the voltages applied to the terminal pair BT02.

The state where voltages that make the terminal B1 a positive electrode and the terminal B2 a negative electrode are applied to the terminal pair BT02 is described as an example. At this time, in the case where the battery BT09 on the most downstream side of the battery portion BIOS is in the charge battery group, the switch pair BT17 is controlled to be connected to the positive electrode terminal of the battery BT09 by the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery BT09 by the control signal S2. That is, the switch of the switch pair BT18 connected to the bus BT15 is turned on, and the switch of the switch pair BT18 connected to the bus BT16 is turned off. In this manner, terminals with the same polarity are connected to each other between the terminal pair BT02 and the charge battery group. In addition, the current which flows from the terminal pair BT02 is controlled to be supplied in a direction in which the charge battery group is charged.

In addition, instead of the switching circuit BT05, the switching circuit BT04 may include the current control switch 152. In this case, the polarities of the voltages applied to the terminal pair BT02 are controlled by controlling the polarities of the voltages applied to the terminal pair BT01 in response to the current control switch BT14 and the control signal S1. In addition, the current control switch BT14 controls the direction of current which flows to the charge battery group from the terminal pair BT02.

FIG. 14 is a circuit diagram illustrating configuration examples of the switching circuit BT04 and the switching circuit BT05 which are different from FIG. 13.

In FIG. 14, the switching circuit BT04 includes a plurality of transistor pairs BT21, a bus BT24, and a bus BT25. The bus BT24 is connected to the terminal A1. Furthermore, the bus BT25 is connected to the terminal A2. One end of each of the plurality of transistor pairs BT21 branches off from a transistor BT22 and a transistor BT23. Sources or drains of the transistors BT22 are connected to the bus BT24. Furthermore, sources or drains of the transistors BT23 are connected to the bus BT25. In addition, the other end of each of the plurality of transistor pairs BT21 is connected between two adjacent batteries BT09. Note that the other end of the transistor pair BT21 on the most upstream side of the plurality of transistor pairs BT21 is connected to the positive electrode terminal of the battery BT09 on the most upstream side of the battery portion BT08. Furthermore, the other end of the transistor pair BT21 on the most downstream side of the plurality of transistor pairs BT21 is connected to a negative electrode terminal of the battery BT09 on the most downstream side of the battery portion BT08.

The switching circuit BT04 switches the connection destination of the transistor pair BT21 to one of the terminal A1 or the terminal A2 by changing the on/off state of the transistors BT22 and BT23 in response to the control signal S1. Specifically, when the transistor BT22 is on, the transistor BT23 is off, so that the connection destination thereof is the terminal A1. On the other hand, when the transistor BT23 is on, the transistor BT22 is off, so that the connection destination thereof is the terminal A2. Which of the transistors BT22 and BT23 is turned on is determined by the control signal S1.

Two transistor pairs BT21 are used to connect the terminal pair BT01 and the discharge battery group. Specifically, the connection destinations of the two transistor pairs BT21 are determined on the basis of the control signal S1, whereby the discharge battery group and the terminal pair BT01 are connected. The connection destinations of the two transistor pairs BT21 are controlled by the control signal S1 so that one of them is the terminal A1 and the other is the terminal A2.

The switching circuit BT05 includes a plurality of transistor pairs BT31, a bus BT34, and a bus BT35. The bus BT34 is connected to the terminal B1. Furthermore, the bus BT35 is connected to the terminal B2. One end of each of the plurality of transistor pairs BT31 branches off from a transistor BT32 and a transistor BT33. One terminal branching off from the transistor BT32 is connected to the bus BT34. Furthermore, the other terminal branching off from the transistor BT33 is connected to the bus BT35. Furthermore, the other end of each of the plurality of transistor pairs BT31 is connected between two adjacent batteries BT09. Note that the other end of a switching switch pair 154 positioned on the most upstream side of a plurality of switching switch pairs 154 is connected to the positive electrode terminal of the battery BT09 positioned on the most upstream side of the battery portion BT08. Furthermore, the other end of the transistor pair BT31 on the most downstream side of the plurality of transistor pairs BT31 is connected to the negative electrode terminal of the battery BT09 positioned on the most downstream side of the battery portion BT08.

The switching circuit BT05 switches the connection destination of the transistor pair BT31 to one of the terminal B1 or the terminal B2 by changing the on/off state of the transistors BT32 and BT33 in response to the control signal S2. Specifically, when the transistor BT32 is on, the transistor BT33 is off, so that the connection destination thereof is the terminal Bi. Reversely, when the transistor BT33 is on. the transistor BT32 is off, so that the connection destination thereof is the terminal B2. Which of the transistors BT32 and BT33 is turned on is determined by the control signal S2.

Two transistor pairs BT31 are used to connect the terminal pair BT02 and the charge battery group. Specifically, the connection destinations of the two transistor pairs BT31 are determined on the basis of the control signal S2, whereby the charge battery group and the terminal pair BT02 are connected. The connection destinations of the two transistor pairs BT31 are controlled by the control signal S2 so that one of them is the terminal B1 and the other is the terminal B2.

Furthermore, the connection destinations of the two transistor pairs BT31 are determined by the polarities of the voltages applied to the terminal pair BT02. Specifically, in the case where voltages which make the terminal B1 a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In addition, in the case where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity are connected to each other between the terminal pair BT02 and the charge battery group. In addition, the current which flows from the terminal pair BT02 is controlled to be supplied in the direction in which the charge battery group is charged.

The voltage transformation control circuit BT06 controls the operation of the voltage transformer circuit BT07. The voltage transformation control circuit BT06 generates a voltage transformation signal S3 for controlling the operation of the voltage transformer circuit BT07 on the basis of the number of the batteries BT09 included in the discharge battery group and the number of the batteries BT09 included in the charge battery group and outputs it to the voltage transformer circuit BT07.

Note that in the case where the number of the batteries BT09 included in the discharge battery group is larger than that included in the charge battery group, it is necessary to prevent a charging voltage which is too high from being applied to the charge battery group. Thus, the voltage transformation control circuit BT06 outputs the voltage transformation signal S3 for controlling the voltage transformer circuit BT07 so that a discharging voltage (Vdis) is lowered within a range where the charge battery group can be charged.

In addition, in the case where the number of the batteries BT09 included in the discharge battery group is less than or equal to that included in the charge battery group, a charging voltage necessary for charging the charge battery group needs to be ensured. Therefore, the voltage transformation control circuit BT06 outputs the voltage transformation signal S3 for controlling the voltage transformer circuit BT07 so that the discharging voltage (Vdis) is raised within a range where a charging voltage which is too high is not applied to the charge battery group.

Note that the voltage value of the charging voltage which is too high can be determined in the light of product specifications and the like of the battery BT09 used in the battery portion BT08. In addition, the voltage which is raised and lowered by the voltage transformer circuit BT07 is applied as a charging voltage (Vcha) to the terminal pair BT02.

Figure 15A:
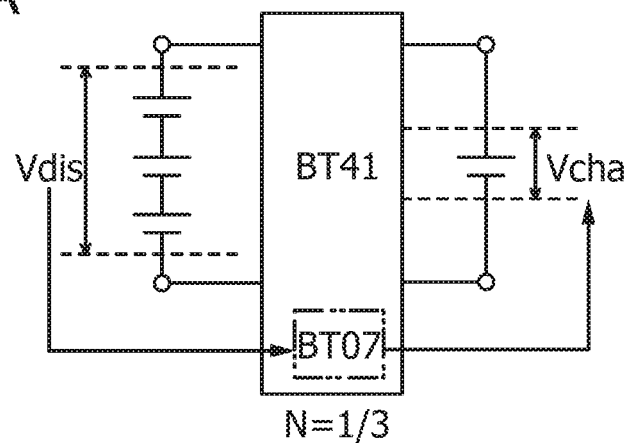
FIG. 15 A conceptual diagram illustrating a battery management unit of a power storage device.
Figure 15B:
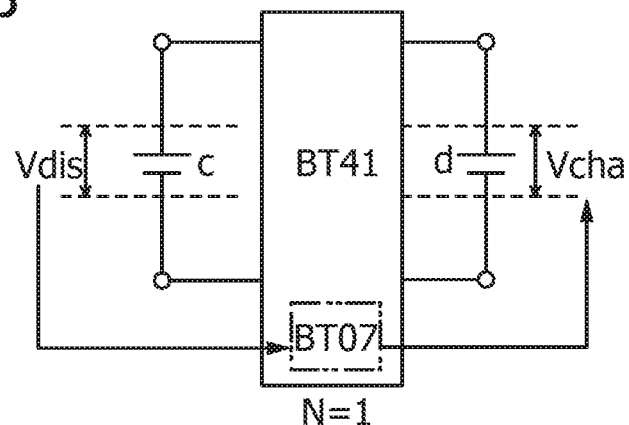
Figure 15C:
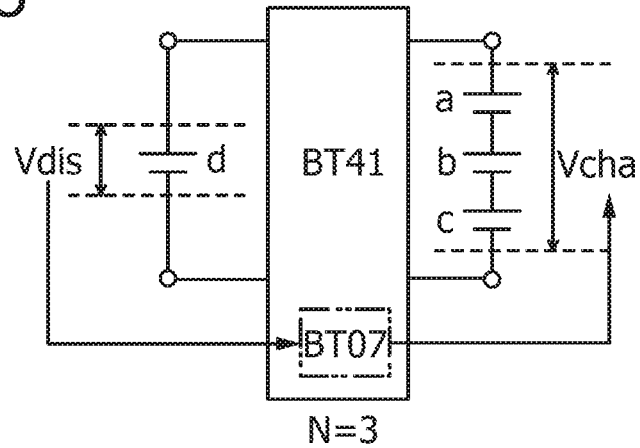

Here, operation examples of the voltage transformation control circuit BT06 in this embodiment will be described with reference to FIGS. 15(A) to (C). FIGS. 15(A) to (C) are conceptual diagrams for explaining the operation examples of the voltage transformation control circuits BT06 for the discharge battery groups and the charge battery groups described in FIGS. 12(A) to (C). Note that FIGS. 15(A) to (C) illustrate a battery management unit BT41. The battery management unit BT41 is composed of the terminal pair BT01, the terminal pair BT02, the switching control circuit BT03, the switching circuit BT04, the switching circuit BT05, the voltage transformation control circuit BT06, and the voltage transformer circuit BT07 as described above.

In an example illustrated in FIG. 15(A), the series of three high-voltage cells a to c and one low-voltage cell d are connected in series as described in FIG. 12(A). In this case, as described using FIG. 12(A), the switching control circuit BT03 determines the high-voltage cells a to c as the discharge battery group, and determines the low-voltage cell d as the charge battery group. In addition, the voltage transformation control circuit BT06 calculates a ratio N for raising or lowering the discharging voltage (Vdis) based on the ratio of the number of the batteries BT09 included in the charge battery group to the number of the batteries BT09 included in the discharge battery group.

Note that in the case where the number of the batteries BT09 included in the discharge battery group is larger than that included in the charge battery group, when a discharging voltage is applied to the terminal pair BT02 without transforming the voltage, an overvoltage may be applied to the batteries BT09 included in the charge battery group through the terminal pair BT02. Thus, in the case shown in FIG. 15(A), it is necessary that a charging voltage (Vcha) applied to the terminal pair BT02 be lower than the discharging voltage. In addition, in order to charge the charge battery group, it is necessary that the charging voltage be higher than the total voltage of the batteries BT09 included in the charge battery group. Thus, the voltage transformation control circuit BT06 sets the ratio N for raising or lowering voltage larger than the ratio of the number of the batteries BT09 included in the charge battery group to the number of the batteries BT09 included in the discharge battery group.

Thus, the voltage transformation control circuit BT06 preferably sets the ratio N for raising or lowering voltage larger than the ratio of the number of the batteries BT09 included in the charge battery group to the number of the batteries BT09 included in the discharge battery group by about 1 to 10%. In this case, the charging voltage is made higher than the voltage of the charge battery group, but the charging voltage is equal to the voltage of the charge battery group in reality. Note that the voltage transformation control circuit BT06 feeds a current for charging the charge battery group in accordance with the ratio N for raising or lowering voltage in order to make the voltage of the charge battery group equal to the charging voltage. The value of the current is set by the voltage transformation control circuit BT06.

In the example illustrated in FIG. 15(A), since the number of the batteries BT09 included in the discharge battery group is three and the number of the batteries BT09 included in the charge battery group is one, the voltage transformation control circuit BT06 calculates a value which is slightly larger than 1/3 as the ratio N for raising or lowering voltage. Then, the voltage transformation control circuit BT06 outputs the voltage transformation signal S3, which lowers the discharging voltage in accordance with the ratio N for raising or lowering voltage and converts the voltage into a charging voltage, to the voltage transformer circuit BT07. Then, the voltage transformer circuit BT07 applies the charging voltage which is obtained by transformation in response to the voltage transformation signal S3 to the terminal pair BT02. Then, the batteries BT09 included in the charge battery group are charged with the charging voltage applied to the terminal pair BT02.

In examples illustrated in FIGS. 15(B) and 15(C), the ratio N for raising or lowering voltage is calculated in a manner similar to that of FIG. 15(A). In the examples illustrated in FIGS. 15(B) and 15(C), since the number of the batteries BT09 included in the discharge battery group is less than or equal to the number of the batteries BT09 included in the charge battery group, the ratio N for raising or lowering voltage is 1 or more. Therefore, in this case, the voltage transformation control circuit BT06 outputs the voltage transformation signal S3 for raising the discharging voltage and converting it into the charging voltage.

The voltage transformer circuit BT07 converts the discharging voltage applied to the terminal pair BT01 into a charging voltage on the basis of the voltage transformation signal S3. Furthermore, the voltage transformer circuit BT07 applies the charging voltage obtained by conversion to the terminal pair BT02. Here, the voltage transformer circuit BT07 electrically insulates the terminal pair BT01 from the terminal pair BT02. Accordingly, the voltage transformer circuit BT07 prevents a short circuit due to a difference between the absolute voltage of the negative electrode terminal of the battery BT09 positioned on the most downstream side of the discharge battery group and the absolute voltage of the negative electrode terminal of the battery BT09 on the most downstream side of the charge battery group. Furthermore, the voltage transformer circuit BT07 converts the discharging voltage, which is the total voltage of the discharge battery group, into the charging voltage on the basis of the voltage transformation signal S3 as described above.

Furthermore, the voltage transformer circuit BT07 can use an insulated type DC (Direct Current)-DC converter or the like, for example. In this case, the voltage transformation control circuit BT06 controls the charging voltage converted by the voltage transformer circuit BT07 by outputting a signal for controlling the on/off ratio (the duty ratio) of the insulated type DC-DC converter as the voltage transformation signal S3.

Note that as the insulated type DC-DC converter, there are a flyback type, a forward type, a RCC (Ringing Choke Converter) type, a push-pull type, a half-bridge type, a full-bridge type, and the like, and a suitable mode is selected in accordance with the value of the intended output voltage.

Figure 16:
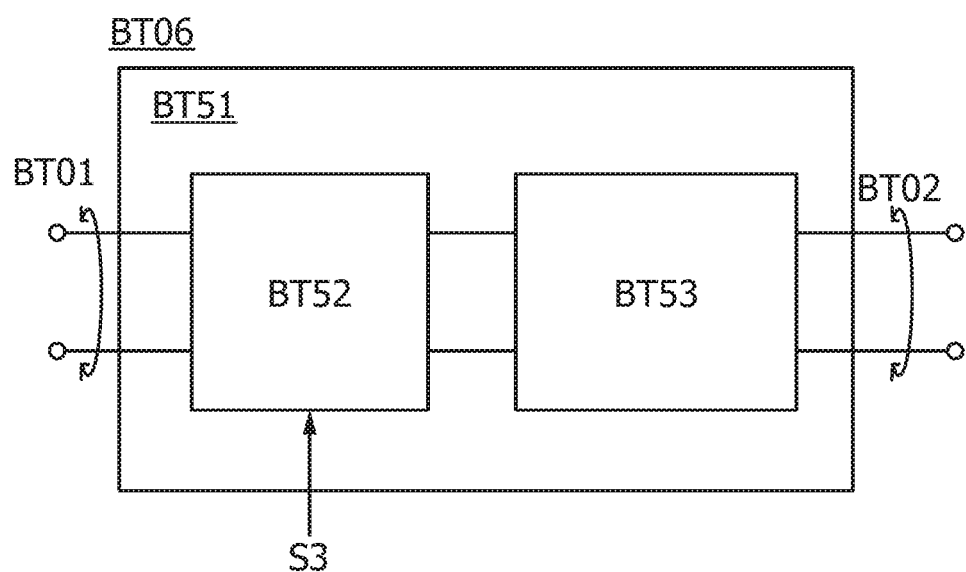
FIG. 16 A block diagram illustrating a battery management unit of a power storage device.

The configuration of the voltage transformer circuit BT07 using the insulated type DC-DC converter is illustrated in FIG. 16. An insulated type DC-DC converter BT51 includes a switch portion BT52 and a transformer portion BT53. The switch portion BT52 is a switch for switching on/off of the operation of the insulated type DC-DC converter, and is obtained using a MOSFET (Metal-Oxide-Semiconductor Field-Effect Transistor), a bipolar type transistor, or the like. Furthermore, the switch portion BT52 periodically switches the on state and the off state of the insulated type DC-DC converter BT51 on the basis of the voltage transformation signal S3 for controlling the on/off ratio which is output from the voltage transformation control circuit BT06. Note that the switch portion BT52 can have various structures in accordance with the type of the insulated type DC-DC converter which is used. The transformer portion BT53 converts the discharging voltage applied from the terminal pair BT01 into the charging voltage. In detail, the transformer portion BT53 operates in conjunction with the on/off state of the switch portion BT52 and converts the discharging voltage into the charging voltage in accordance with the on/off ratio. As the time during which the switch portion BT52 is on is longer in its switching period, the charging voltage is higher. On the other hand, as the time during which the switch portion BT52 is on is shorter in its switching period, the charging voltage is lower. Note that in the case where the insulated type DC-DC converter is used, the terminal pair BT01 and the terminal pair BT02 can be insulated from each other inside the transformer portion BT53.

Figure 17:
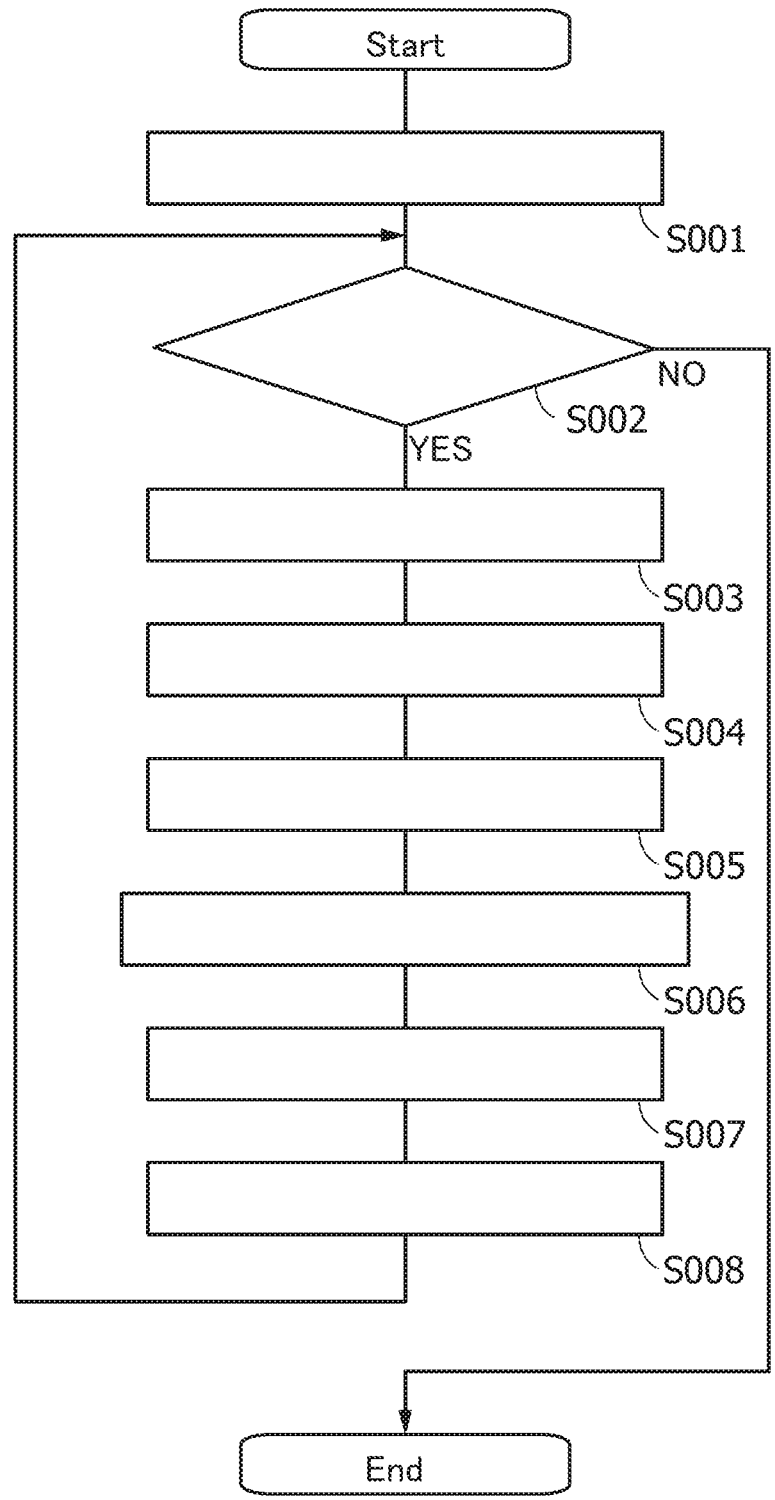
FIG. 17 A flow chart illustrating a battery management unit of a power storage device.

A flow of processing of the power storage device BT00 in this embodiment will be described with reference to FIG. 17. FIG. 17 is a flow chart from start (Start) to end (End) showing the flow of the processing of the power storage device BT00.

First, the power storage device BT00 obtains a voltage measured for each of the plurality of batteries BT09 (step S001). Then, the power storage device BT00 determines whether or not the condition for starting the operation of making the plurality of batteries BT09 uniform in voltage is satisfied (step S002). The start condition can be, for example, whether or not the difference between the maximum value and the minimum value of the voltage measured for each of the plurality of batteries BT09 is greater than or equal to the predetermined threshold value, or the like. In the case where the start condition is not satisfied (step S002: NO), the power storage device BT00 does not perform the following processing because voltages of the batteries BT09 are well balanced. In contrast, in the case where the start condition is satisfied (step S002: YES), the power storage device BT00 performs the processing of making the batteries BT09 uniform in voltage. In this processing, the power storage device BT00 determines whether each battery BT09 is a high voltage cell or a low voltage cell on the basis of the measured voltage of each battery (step S003). Then, the power storage device BT00 determines a discharge battery group and a charge battery group on the basis of the determination result (step S004). In addition, the power storage device BT00 generates the control signal S1 for setting the connection destination of the terminal pair BT01 to the determined discharge battery group, and the control signal S2 for setting the connection destination of the terminal pair BT02 to the determined charge battery group (step S005). The power storage device BT00 outputs the generated control signals S1 and S2 to the switching circuit BT04 and the switching circuit BT05, respectively. Then, the switching circuit BT04 connects the terminal pair BT01 and the discharge battery group, and the switching circuit BT05 connects the terminal pair BT02 and the discharge battery group (step S006). Furthermore, the power storage device BT00 generates the voltage transformation signal S3 on the basis of the number of the batteries BT09 included in the discharge battery group and the number of the batteries BT09 included in the charge battery group (step S007). Then, the power storage device BT00 converts, on the basis of the voltage transformation signal S3, the discharging voltage applied to the terminal pair BT01 into a charging voltage and applies it to the terminal pair BT02 (step S008). In this way, charge of the discharge battery group is transferred to the charge battery group.

Furthermore, although the plurality of steps are shown in order in the flow chart of FIG. 17, the order of performing the steps is not limited to the order.

As described above, according to this embodiment, when charge is transferred from the discharge battery group to the charge battery group, a structure where charge from the discharge battery group is temporarily stored and then is sent to the charge battery group is unnecessary, unlike in the a capacitive type. Accordingly, the charge transfer efficiency per unit time can be increased. In addition, the switching circuit BT04 and the switching circuit BT05 can individually change the discharge battery group and the charge battery group.

Furthermore, the voltage transformer circuit BT07 converts the discharging voltage applied to the terminal pair BT01 into the charging voltage based on the number of the batteries BT09 included in the discharge battery group and the number of the batteries BT09 included in the charge battery group, and applies it to the terminal pair BT02. Thus, charge can be transferred without any problems regardless of how the batteries BT09 on the discharge side and the charge side are selected.

Furthermore. the use of OS transistors as the transistor BT10 and the transistor BT13 can reduce the amount of charge that leaks from the batteries BT09 not belonging to the charge battery group or the discharge battery group. Accordingly, a decrease in capacity of the batteries BT09 which do not contribute to charging or discharging can be suppressed. In addition, the variations in characteristics of the OS transistor due to heat are smaller than those of a Si transistor. Accordingly, even when the temperature of the batteries BT09 is increased, a normal operation such as switching the on state and the off state in response to the control signals Si and S2 can be performed.

(Embodiment 4)

In this embodiment, examples of electronic devices that can include the secondary battery described in Embodiment 1 are described.

Figure 18A:
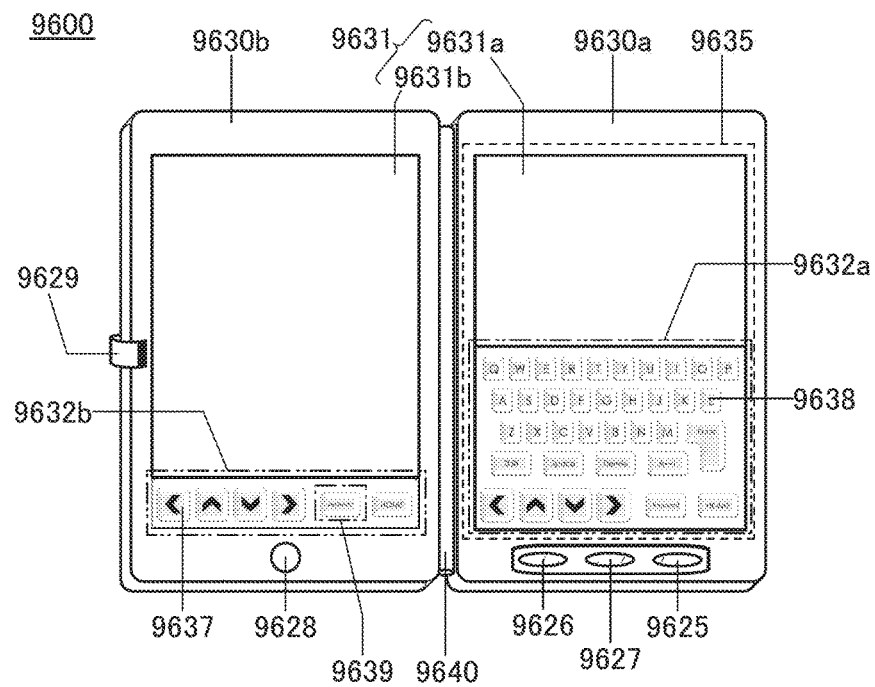
FIG. 18 A diagram illustrating an example of an electronic device.
Figure 18B:
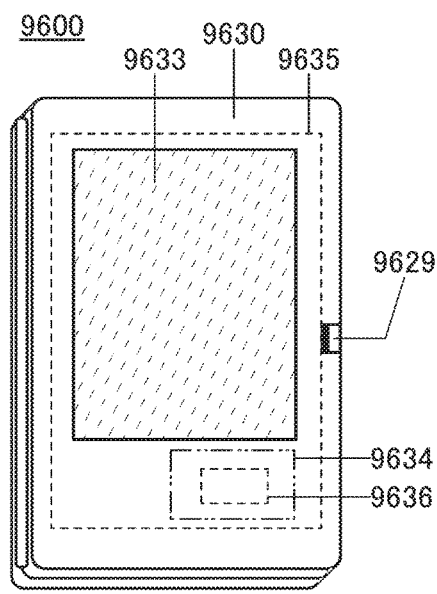

FIGS. 18(A) and 18(B) illustrate an example of a tablet type terminal that can be folded in half. A tablet type terminal 9600 illustrated in FIGS. 18(A) and 18(B) includes a housing 9630a, a housing 9630b, a movable portion 9640 connecting the housings 9630a and 9630b, a display portion 9631 including a display portion 9631a and a display portion 9631b, a display mode changing switch 9626, a power switch 9627, a power saving mode changing switch 9625, a fastener 9629, and an operation switch 9628. FIG. 18(A) illustrates the tablet type terminal 9600 that is opened, and FIG. 18(B) illustrates the tablet type terminal 9600 that is closed.

Furthermore, the tablet type terminal 9600 includes a secondary battery 9641 of one embodiment of the present invention over a printed board 9635 inside the housing 9630a.

Part of the display portion 9631a can be a touch panel region 9632a, and data can be input by touching operation keys 9638 that are displayed. Note that for example, half of the area of the display portion 9631a has only a display function and the other half of the area has a touch panel function; however, the structure is not limited thereto. All the area of the display portion 9631a may have a touch panel function. For example, all the area of the display portion 9631a can display a keyboard and serve as a touch panel, and the display portion 9631b can be used as a display screen.

Furthermore, as for the display portion 9631b, part of the display portion 9631b can be a touch panel region 9632b as in the display portion 9631a. Furthermore, when the position where a keyboard display switching button 9639 is displayed on the touch panel is touched with a finger, a stylus, or the like, a keyboard can be displayed on the display portion 9631b.

Furthermore, touch input can be performed in the touch panel region 9632a and the touch panel region 9632b at the same time.

Furthermore, the display mode changing switch 9626 allows switching the direction of display such as landscape display and portrait display and selecting a switch of black-and-white display and color display, and the like. The power saving mode changing switch 9625 can optimize display luminance in accordance with the amount of external light in use which is detected with an optical sensor incorporated in the tablet type terminal 9600. In addition to the optical sensor, other detecting devices such as sensors for detecting inclination, such as a gyroscope or an acceleration sensor, may be incorporated in the tablet type terminal.

Furthermore, although FIG. 18(A) illustrates an example where the display portion 9631a and the display portion 9631b have the same display area, without particular limitation, one of them and the other may have different sizes and different display qualities. For example, one of them may be a display panel capable of displaying higher definition images than the other.

FIG. 18(B) is a closed state, and the tablet type terminal includes the housing 9630, a solar cell 9633, and a charge and discharge control circuit 9634.

Note that the tablet type terminal 9600 can be folded in half; thus, it can be folded such that the housings 9630a and 9630b overlap with each other when not in use. Folding it can protect the display portions 9631a and 9631b, which increases the durability of the tablet type terminal 9600. Furthermore, as for the secondary battery 9641 using the secondary battery of one embodiment of the present invention, a plurality of small secondary batteries with different output voltages can be provided over a substrate; thus, power consumption of the tablet type terminal 9600 can be reduced.

Furthermore, other than that, the tablet type terminal illustrated in FIGS. 18(A) and 18(B) can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet type terminal, can supply electric power to a touch panel, a display portion, an image signal processing portion, and the like. Note that the solar cell 9633 can be provided on one or two surfaces of the housing 9630 and the secondary battery 9641 can be charged efficiently.

Figure 18C:
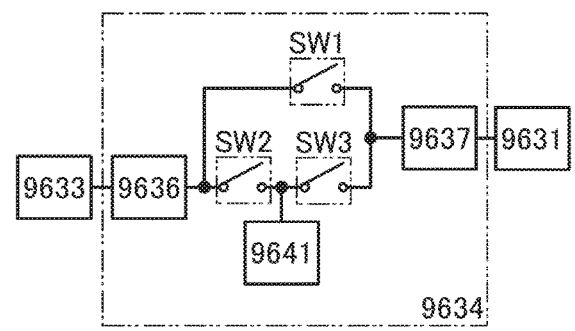

The structure and operation of the charge and discharge control circuit 9634 illustrated in FIG. 18(B) are described by showing a block diagram in FIG. 18(C). The solar cell 9633, the secondary battery 9641, the DCDC converter 9636, a converter 9637, switches SW1 to SW3, and the display portion 9631 are illustrated in FIG. 18(C), and the secondary battery 9641, the DCDC converter 9636, the converter 9637, and the switches SW1 to SW3 correspond to the charge and discharge control circuit 9634 illustrated in FIG. 18(B).

First, an example of operation when electric power is generated by the solar cell 9633 using external light is described. The voltage of electric power generated by the solar cell is raised or lowered by the DCDC converter 9636 to a voltage for charging the secondary battery 9641. In addition, when the display portion 9631 is operated with the electric power from the solar cell 9633, the switch SW1 is turned on and the voltage of the electric power is raised or lowered by the converter 9637 to a voltage needed for the display portion 9631. When display on the display portion 9631 is not performed, the switch SW1 is turned off and the switch SW2 is turned on, so that the secondary battery 9641 can be charged.

Note that the solar cell 9633 is described as an example of a power generation means; however, without particular limitation, the secondary battery may be charged using another power generation means such as a piezoelectric element (piezoelectric element) or a thermoelectric conversion element (Peltier element). For example, charge may be performed with a non-contact power transmission module that performs charge by transmitting and receiving electric power wirelessly (without contact), or a combination of other charge means.

Figure 19:
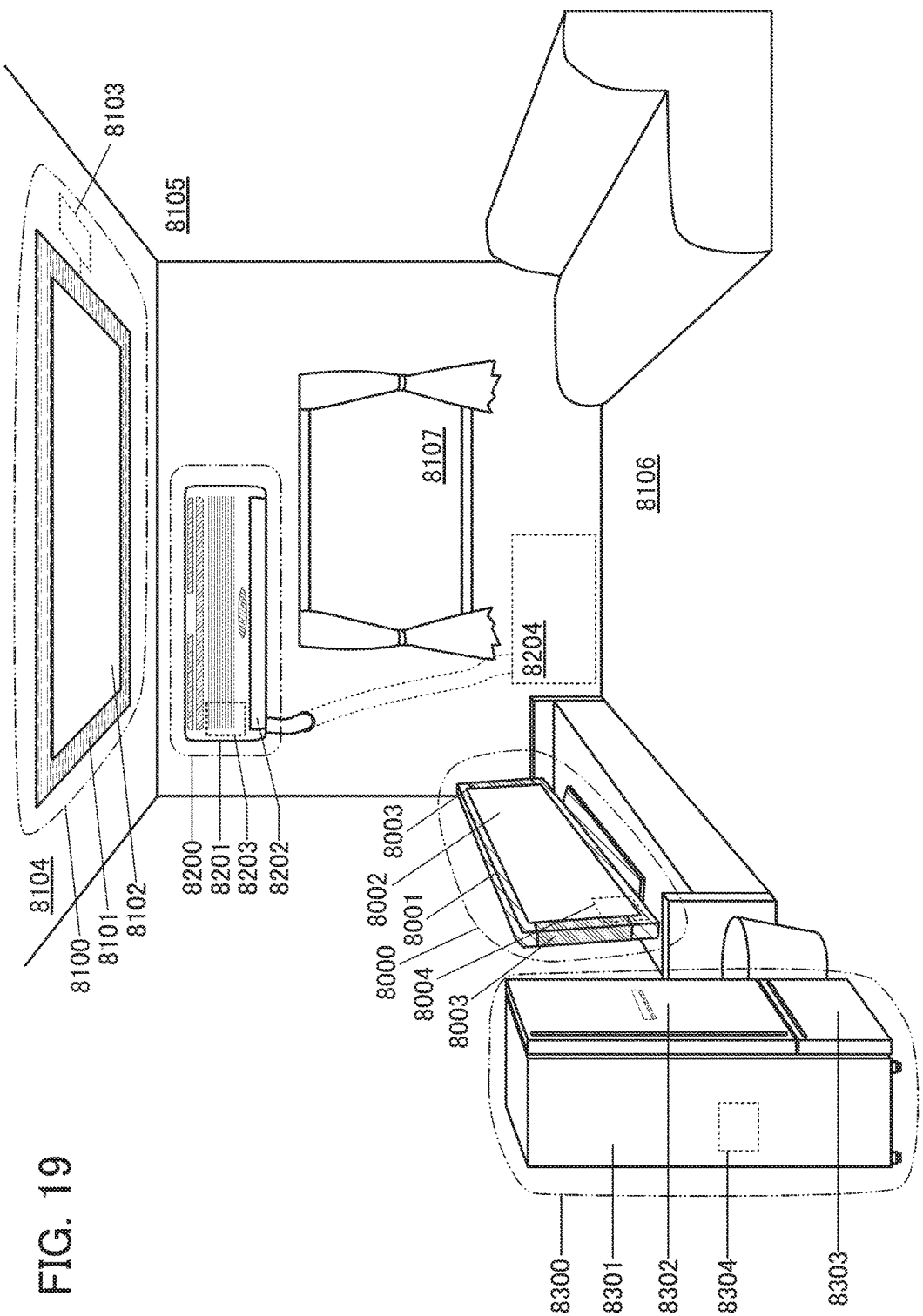
FIG. 19 A diagram illustrating an example of an electronic device.

FIG. 19 illustrates other examples of electronic devices. In FIG. 19, a display device 8000 is an example of an electronic device using a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 relating to one embodiment of the present invention is provided in the housing 8001.

A semiconductor display device such as a liquid crystal display device, a light-emitting device in which a light-emitting element such as an organic EL element is provided in each pixel, an electrophoresis display device, a DMD (Digital Micromirror Device), a PDP (Plasma Display Panel), or a FED (Field Emission Display) can be used for the display portion 8002.

Note that the display device includes all of display devices for information display for personal computers, advertisement displays, and the like besides TV broadcast reception.

In FIG. 19, an installation lighting device 8100 is an example of an electronic device using the secondary battery relating to one embodiment of the present invention. Specifically, the lighting device 8100 includes a housing 8101, a light source 8102, the control substrate 8103, and the like. In FIG. 19, the secondary battery is provided over the control substrate 8103.

Note that although the installation lighting device 8100 provided in the ceiling 8104 is illustrated in FIG. 19 as an example, the secondary battery relating to one embodiment of the present invention can be used in an installation lighting device provided in, for example, a wall 8105, a floor 8106, a window 8107, or the like other than the ceiling 8104 and can be used in a tabletop lighting device or the like.

In addition, as the light source 8102, an artificial light source from which light is artificially obtained using electric power can be used. Specifically, an incandescent lamp, a discharge lamp such as a fluorescent lamp, and light-emitting elements such as an LED and an organic EL element are given as examples of the artificial light source.

In FIG. 19, an air conditioner including an indoor unit 8200 and an outdoor unit 8204 is an example of an electronic device using the secondary battery relating to one embodiment of the present invention. Specifically, the indoor unit 8200 includes a housing 8201, a blast outlet 8202, a control substrate 8203 provided with the secondary battery, and the like.

Note that although the split-type air conditioner including the indoor unit and the outdoor unit is illustrated in FIG. 19 as an example, the secondary battery relating to one embodiment of the present invention can be used in an integral-type air conditioner in which the functions of an indoor unit and an outdoor unit are included in one housing.

In FIG. 19, an electric refrigerator-freezer 8300 is an example of an electronic device using the secondary battery relating to one embodiment of the present invention. Specifically, the electric refrigerator-freezer 8300 includes a housing 8301, a door for a refrigerator 8302, a door for a freezer 8303, a control substrate 8304 provided with the secondary battery, and the like. The control substrate 8304 is provided in the housing 8301 in FIG. 19.

This embodiment can be implemented in combination with the other embodiments as appropriate.

(Embodiment 5)

In this embodiment, examples of vehicles on which the secondary battery described in Embodiment 1 is mounted are described.

Figure 20:
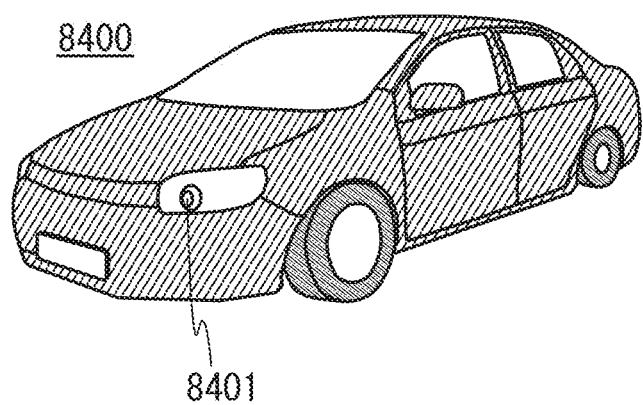
FIG. 20 A diagram illustrating an example of an electronic device.

FIG. 20 illustrates an example of a vehicle using one embodiment of the present invention. The automobile 8400 illustrated in FIG. 20 includes the secondary battery over a control substrate. The secondary battery is capable of supplying electric power to a light-emitting device such as a headlight 8401 or a room light (not illustrated).

The secondary battery can also supply electric power to a display device of a speedometer, a tachometer, or the like included in the automobile 8400. Furthermore, the secondary battery can supply electric power to a semiconductor device included in the automobile 8400, such as a navigation system.

This embodiment can be implemented in appropriate combination with the other embodiments.

REFERENCE NUMERALS

100 cell, 100_1 cell, 100_2 cell, 100_3 cell, 111 positive electrode current collector, 112 positive electrode active material layer, 113 spacer, 114 electrolytic solution, 115 negative electrode current collector, 116 negative electrode active material layer, 151 switch, 152 current control switch, 154 switch pair, 200 secondary battery, 201 positive electrode terminal, 202 PTC, 203 conductive paste, 204 exterior body, 205 negative electrode terminal, 206 insulator, 207 insulator, 208 insulator, 209 insulator, 301 hole, 302 upper mold, 303 heater. 304 lower mold, 305 air hole, 306 dicing saw, 8000 display device, 8001 housing, 8002 display portion, 8003 speaker portion, 8004 secondary battery, 8100 lighting device, 8101 housing, 8102 light source, 8103 control substrate, 8104 ceiling, 8105 wall, 8106 floor, 8107 window, 8200 indoor unit, 8201 housing, 8202 blast outlet, 8203 control substrate, 8204 outdoor unit, 8300 electric refrigerator-freezer, 8301 housing, 8302 door for refrigerator, 8303 door for freezer, 8304 control substrate, 9600 tablet type terminal, 9625 switch, 9626 switch, 9627 power switch, 9628 operation switch, 9629 fastener, 9630 housing, 9630*a* housing, 9630*b* housing, 9631 display portion, 9631*a* display portion, 9631*b* display portion, 9632*a* region, 9632*b* region, 9633 solar cell, 9634 charge and discharge control circuit, 9635 printed board, 9636 DCDC converter, 9637 converter, 9638 operation key, 9639 button, 9640 movable portion, 9641 secondary battery, A1 terminal, A2 terminal, B1 terminal, B2 terminal, BT00 power storage device, BT01 terminal pair, BT02 terminal pair, BT03 control circuit, BT04 circuit, BT05 circuit, BT06 voltage transformation control circuit, BT07 transformer circuit, BT08 battery portion, BT09 battery, BT10 transistor, BT11 bus, BT12 bus, BT13 transistor, BT14 current control switch, BT15 bus, BT16 bus, BT17 switch pair, BT18 switch pair, BT21 transistor pair, BT22 transistor, BT23 transistor, BT24 bus, BT25 bus, BT31 transistor pair, BT32 transistor, BT33 transistor, BT34 bus, BT35 bus, BT41 battery management unit, BT51 insulated type DC-DC converter, BT52 switch portion, BT53 transformer portion, S1 control signal, S2 control signal, S3 transformation signal, SW1 switch, SW2 switch, SW3 switch.

The invention claimed is:

1. A method for manufacturing a secondary battery, comprising:
    forming a first active material layer and a second active material layer over a first current collector;
    forming a third active material layer and a fourth active material layer over a second current collector;
    positioning a first layer including a first spacer and a second spacer over the first current collector such that the first active material layer and the second active material layer are in contact with the first layer;
    positioning the second current collector over the first layer such that the first layer is in contact with the third active material layer and the fourth active material layer, the first active material layer and the third active material layer overlap with each other, and the second active material layer and the fourth active material layer overlap with each other;
    heating and pressurizing the first current collector, the first active material layer, the second active material layer, the first layer, the third active material layer, the fourth active material layer, and the second current collector;
    injecting an insulator whose fluidity is increased by heating into a region between the first current collector and the second current collector;
    cutting the first current collector, the second current collector, the first layer, and the insulator so as to form a first cell comprising the first active material layer and the third active material layer, and a second cell comprising the second active material layer and the fourth active material layer.

2. The method for manufacturing a secondary battery according to claim 1,
wherein the first layer includes a polymer, and
wherein the first layer comprises a portion of a sheet-like gel.

3. The method for manufacturing a secondary battery according to claim 1, wherein the first spacer and the second spacer are particles including aluminum oxide.

4. The method for manufacturing a secondary battery according to claim 1,
wherein the first layer further comprises a first polymer, a first electrolyte and a first solvent,
wherein the first polymer includes PVDF,
wherein the first electrolyte includes Li(SO2F)2N, and
wherein the first solvent includes ethylene carbonate and propylene carbonate.

5. The method for manufacturing a secondary battery according to claim 1, wherein the first active material layer and the second active material layer are positive electrode active material layers, and the third active material layer and the fourth active material layer are negative electrode active material layers.

6. The method for manufacturing a secondary battery according to claim 1, further comprising:
electrically connecting the first cell and the second cell in series; and
covering the first cell and the second cell with an exterior body.

7. The method for manufacturing a secondary battery according to claim 1,
wherein the first spacer is in contact with the first active material layer and the third active material layer,
wherein the second spacer is in contact with a side surface of the first active material layer.

* * * * *